(12) United States Patent
Weihrauch

(10) Patent No.: US 7,644,466 B2
(45) Date of Patent: Jan. 12, 2010

(54) BRISTLES, METHOD AND DEVICE FOR PRODUCTION THEREOF AND BRUSHES

(75) Inventor: Georg Weihrauch, Wald-Michelbach (DE); Hartmut Lasch, legal representative, Karlsruhe (DE)

(73) Assignee: Geka Brush GmbH, Bechhofen-Waizendorf (DE)

( * ) Notice: Subject to any disclaimer, the term of this patent is extended or adjusted under 35 U.S.C. 154(b) by 829 days.

(21) Appl. No.: 10/508,182

(22) PCT Filed: Mar. 18, 2003

(86) PCT No.: PCT/EP03/02795

§ 371 (c)(1),
(2), (4) Date: Sep. 17, 2004

(87) PCT Pub. No.: WO03/079849

PCT Pub. Date: Oct. 2, 2003

(65) Prior Publication Data

US 2005/0160546 A1 Jul. 28, 2005

(30) Foreign Application Priority Data

Mar. 21, 2002 (DE) .................. 102 12 701

(51) Int. Cl.
*A46D 1/00* (2006.01)
(52) U.S. Cl. ...................... 15/207.2; 428/373
(58) Field of Classification Search ........... 15/207.2, 15/167.1; 428/34.1, 373–375
See application file for complete search history.

(56) References Cited

U.S. PATENT DOCUMENTS

| | | | | |
|---|---|---|---|---|
| 1,773,969 | A | | 8/1930 | Dreyfus |
| 2,524,942 | A | * | 10/1950 | Tomlinson ............ 452/93 |
| 3,195,175 | A | * | 7/1965 | Avery .................. 452/93 |
| 4,534,081 | A | * | 8/1985 | Spademan ........... 15/167.1 |
| 4,913,133 | A | * | 4/1990 | Tichy ................... 601/80 |

(Continued)

FOREIGN PATENT DOCUMENTS

DE 12 05 051 11/1965

(Continued)

OTHER PUBLICATIONS

The Patent Office of The People's Republic of China, Notification of Third Office Action dated Mar. 7, 2008.

*Primary Examiner*—David B Thomas
(74) *Attorney, Agent, or Firm*—Browdy and Neimark, P.L.L.C.

(57) ABSTRACT

The invention concerns a bristle for a brush, in particular a cleaning brush, a toothbrush or an application brush, wherein the bristle has a lower root region with which it can be mounted in or to a bristle support or which forms part of the bristle support, and a free length disposed outside of the bristle support above the root region which is composed of a shaft region bordering the root region and a flexing region disposed thereabove, wherein the shaft region is composed of a lower shaft base section bordering the root region and a shaft section disposed thereabove, and wherein the flexing region is composed of a lower active and flexing section bordering the shaft region and a tip section which is disposed thereabove and forms the free end of the bristle, wherein the bristle has a continuous depression-free jacket in the shaft base section and, at least in sections of the jacket in the flexing region, a profiling which is formed by elevations and/or depressions and which lies in an outer surface of the bristle.

35 Claims, 34 Drawing Sheets

U.S. PATENT DOCUMENTS

| | | | |
|---|---|---|---|
| 5,531,582 A | | 7/1996 | Klinkhammer |
| 5,669,097 A | | 9/1997 | Klinkhammer |
| 5,678,275 A | * | 10/1997 | Derfner ............... 15/167.1 |
| 5,837,179 A | | 11/1998 | Barber et al. |
| 5,926,900 A | | 7/1999 | Bennett |
| 6,261,156 B1 | * | 7/2001 | Johnson et al. ........... 451/41 |
| 6,413,287 B1 | * | 7/2002 | Barber, Jr. ............... 51/298 |
| 6,609,910 B2 | * | 8/2003 | Narayanan ............. 433/118 |
| 6,772,467 B1 | * | 8/2004 | Weihrauch ............ 15/207.2 |
| 2003/0044604 A1 | * | 3/2003 | Weihrauch ............ 428/373 |
| 2003/0163884 A1 | * | 9/2003 | Weihrauch ............ 15/207.2 |

FOREIGN PATENT DOCUMENTS

| | | |
|---|---|---|
| DE | 85 22 986 | 11/1985 |
| DE | 297 00 611 | 4/1997 |
| DE | 197 48 733 | 5/1999 |
| DE | 198 29 943 | 1/2000 |
| DE | 695 18 867 | 2/2001 |
| DE | 199 42 147 | 3/2001 |
| DE | 100 33 256 | 1/2002 |
| GB | 598 821 | 2/1948 |
| GB | 2 323 026 | 9/1998 |
| WO | 01/76414 A1 | 10/2001 |
| WO | WO 02/03831 | 1/2002 |

* cited by examiner

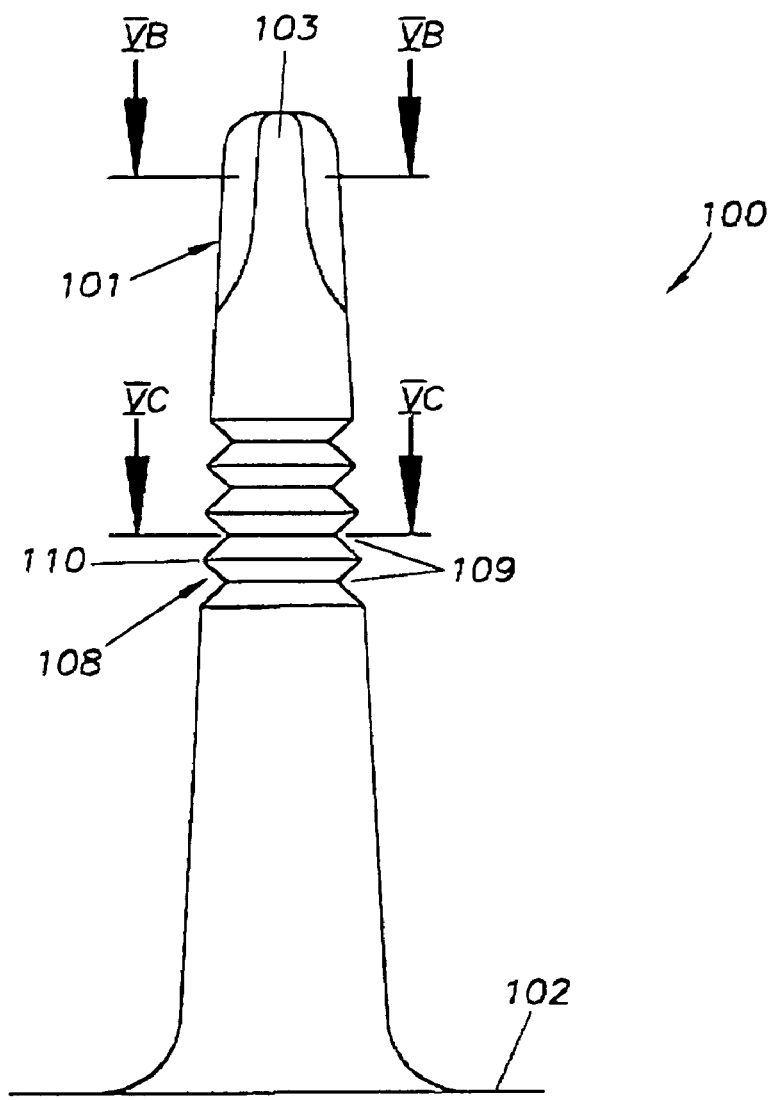
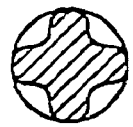
Fig.5B
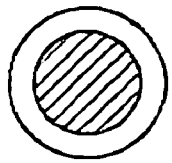
Fig.5C
Fig.5A

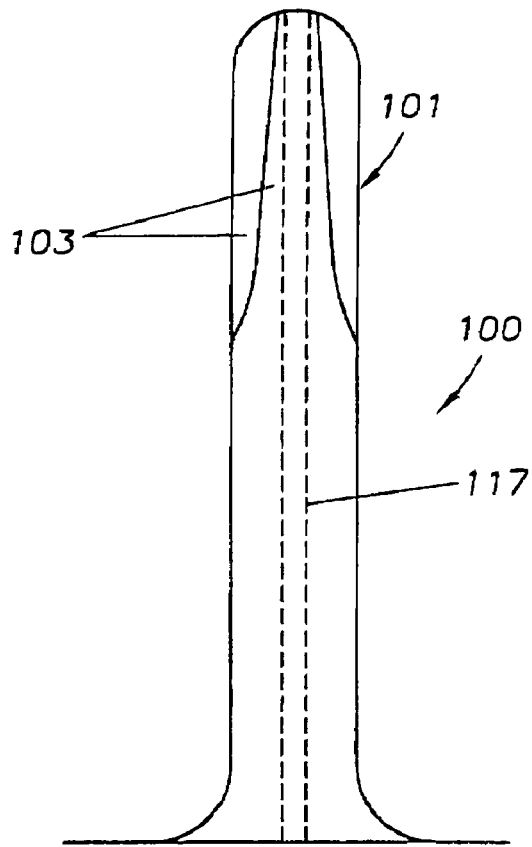
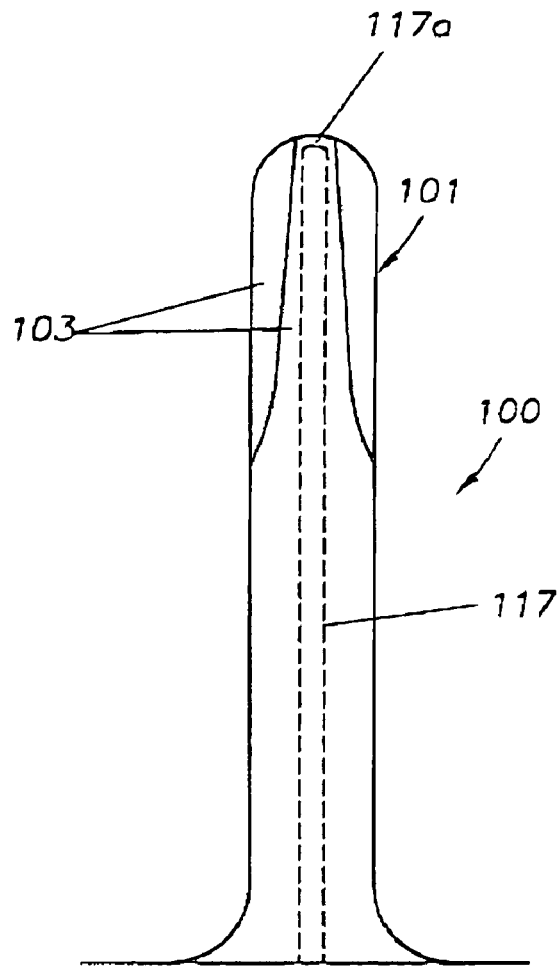
Fig. 19A
Fig. 18A
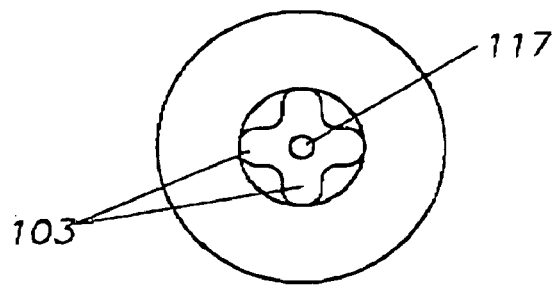
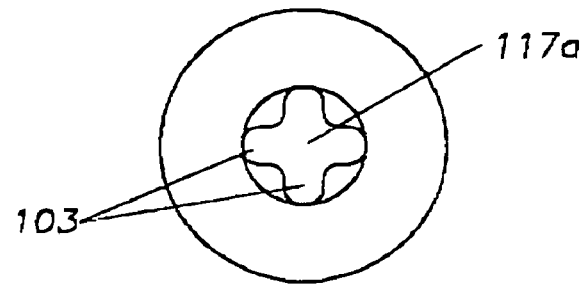
Fig. 19B
Fig. 18B

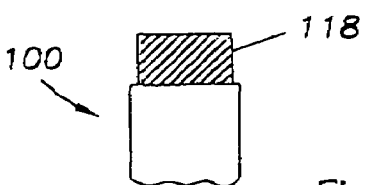
Fig.21A
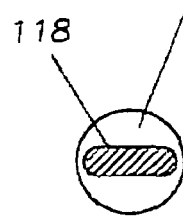 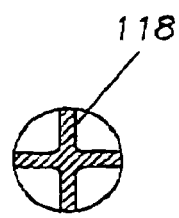  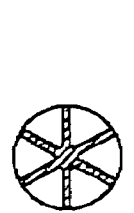  
Fig.21B  Fig.21C  Fig.21D  Fig.21E  Fig.21F  Fig.21G
 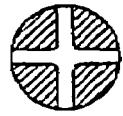   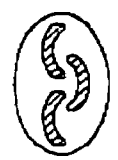 
Fig.21H  Fig.21i  Fig.21J  Fig.21K  Fig.21L  Fig.21M

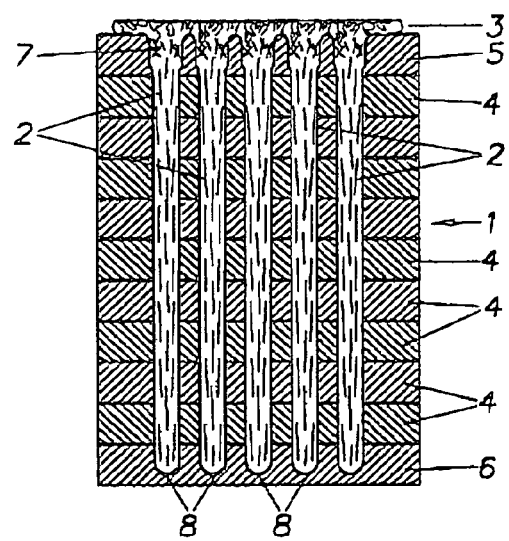
Fig.29
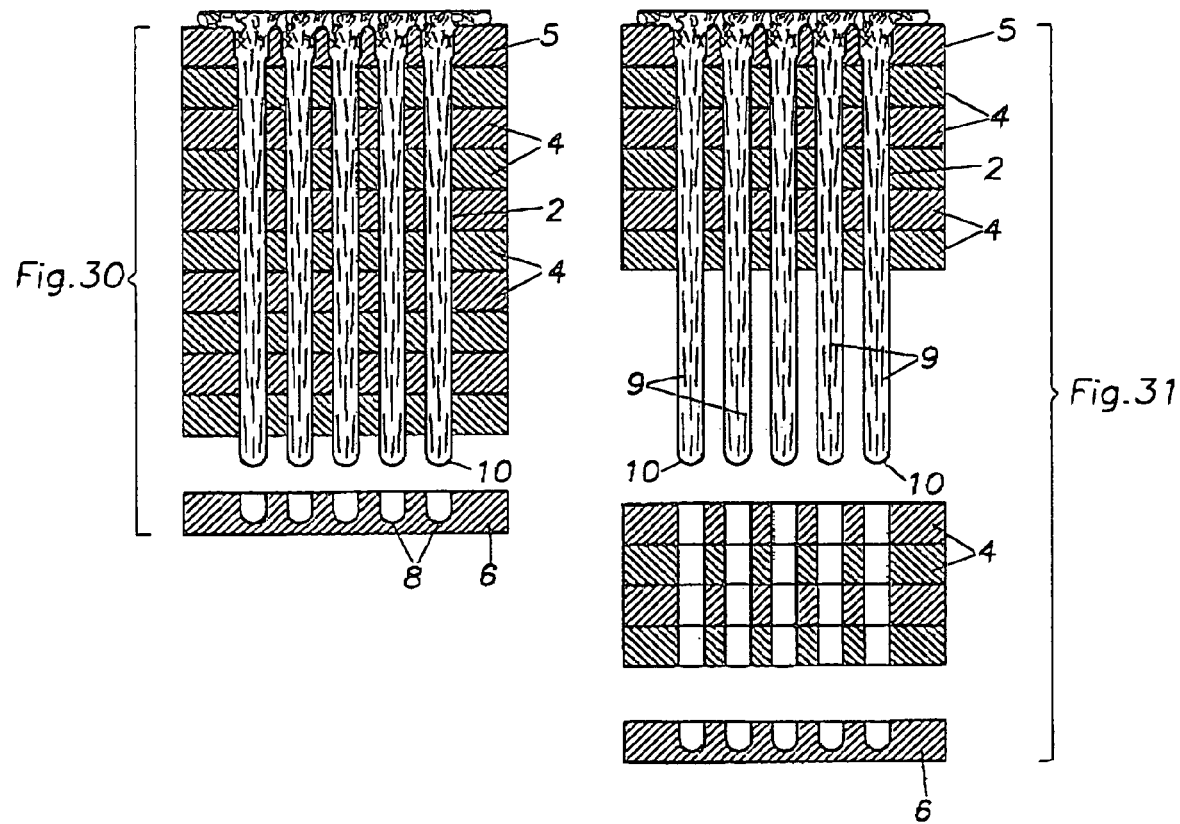
Fig.30
Fig.31

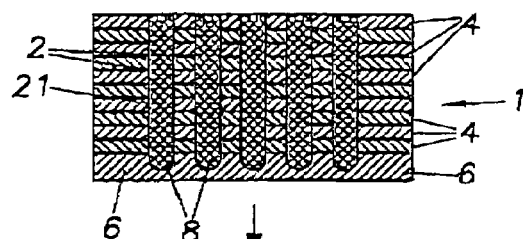
Fig. 35
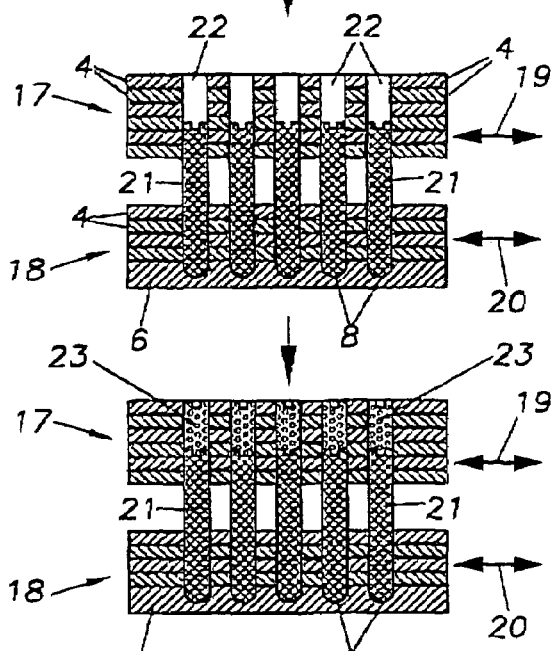
Fig. 36
Fig. 37
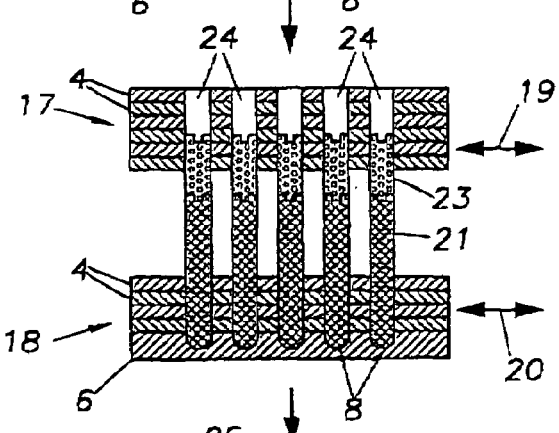
Fig. 38
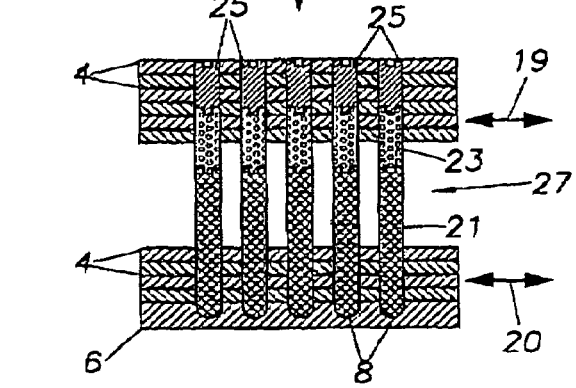
Fig. 39

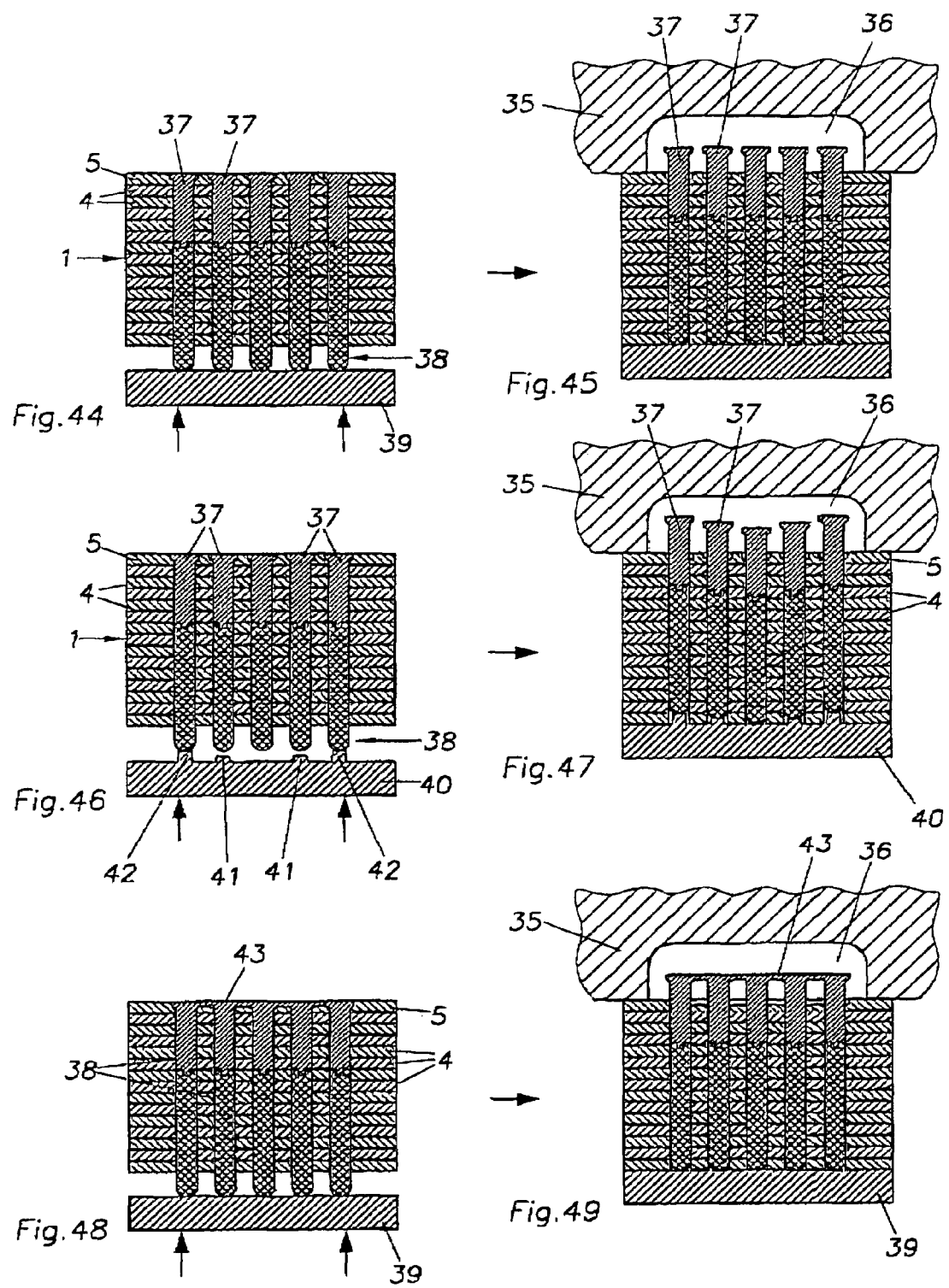

BRISTLES, METHOD AND DEVICE FOR PRODUCTION THEREOF AND BRUSHES

This application is the national stage of PCT/EP03/02795 filed on Mar. 18, 2003 and also claims Paris Convention priority of DE 102 12 701.8 filed Mar. 21, 2002.

BACKGROUND OF THE INVENTION

The invention concerns a bristle for a brush, in particular a cleaning brush, toothbrush or application brush and a method for producing a corresponding bristle of thermoplastic polymers through casting, preferably injection molding. The invention also concerns a device for carrying out the method and a brush comprising corresponding bristles.

Animal hair and natural fibers which were previously used as bristle material for producing brushes, paint brushes or the like have been substantially replaced by plastic bristles, wherein the production of the bristle material is based largely on the well established production of synthetic textile fibers, i.e. extrusion or spinning processes. However, a bristle is subjected to completely different conditions than an endless fiber in a fiber composite. It is free and fixed at only one end and can be regarded in terms of stability as a freely projecting bar which bends and which is fixed at one end. Pressure or compression forces and sometimes also tensile forces occur during use. Compared to endless fibers, the stability requirements are different with regard to bending strength, fatigue strength under reversed bending stresses, buckling resistance and bend recovery.

Corresponding bristles can be used for toothbrushes, cleaning brushes or brooms in particular in the field of hygiene, applicators for powdery or liquid media, in particular liquids, cleaning agents, solvents, paints and varnishes and cosmetics, for application pads, cleaning pads including mats for cleaning shoes, combs, hairbrushes pr technical brushes. By way of example, bristles for a toothbrush are described below. The invention is however not limited thereto.

As has been known for a long time, the cleaning effect of a toothbrush can be improved by providing a structure or profile on the outer surface of the bristle. If the bristles are e.g. provided on their outside with wart-like nubs (DE 100 17 167.2) or ribs (U.S. Pat. No. 1,773,969) the plaque removing effect on the tooth can be increased by up to 50%.

Such bristles having a structure or profile on their outer side are usually produced in the desired cross-sectional shape by extrusion or are surface-formed under continuous processing following production as an unprofiled monofilament. Profiling improves the brushing and cleaning effect but has the disadvantage that the profiling impairs the stability properties of the bristle in its mounting region and the bristle tends to bend or kink.

The known externally profiled bristles also have negative effects on hygiene. Due to the profiling, chambers and undercuts are formed on the bristle proximate to and, in particular, in its fixing region in which impurities may deposit which cannot be removed or which can only be removed to an inappropriate degree due to the densely packed bristle field. This can produce fungal, bacterial and microbial growth.

To increase the brushing and cleaning effect of a bristle, U.S. Pat. No. 3,256,545 and U.S. Pat. No. 4,167,794 suggest providing a widened head at the free end of the bristle, which protrudes laterally by an amount corresponding to several times the diameter of the cylindrical bristle stem. In this design, the fixing region is loaded with high bending moments due to the mass and the brushing resistance of the head, which may cause the bristle to kink even after a short time of use thereby rendering the bristle unusable.

It is the underlying purpose of the present invention to produce a bristle of the above-mentioned type which is hygienically impeccable, strong, efficient and highly stable for a long period of time. The invention should moreover produce a brush comprising corresponding bristles and propose a method for producing a corresponding bristle through casting and in particular injection molding whose bending behavior and bend recovery exceed that of extruded bristles, while permitting optimum realization of the theoretical elasticity values and tensile strengths and which permits production of bristles of high quality over large length ranges even with relatively small cross-sections to be able to produce bristle geometries and bristle arrangements in a simple fashion while thereby adjusting the brushes and paint brushes to the requirements of the final product. The invention is moreover based on providing a device, which is suitable for carrying out the method.

SUMMARY OF THE INVENTION

With regard to bristles, this object is achieved through a bristle comprising the features of the independent claim.

The inventive bristle has no profile in and close to its lower fixing region to obtain good bristle rigidity and stability properties and to avoid formation of recesses and undercuts to reliably eliminate the hygiene problems associated therewith. In particular, the bristle can thereby be designed according to the static requirements, i.e. with respect to a desired deformation behavior and bend recovery. To render the bristle highly efficient (i.e. high brushing and cleaning effect), the surface of its free length is profiled at least in sections at a separation from the fixing region.

To explain the invention, the individual sections of a bristle will be initially defined below with reference to FIG. 1. FIG. 1 shows a bristle 100 having a lower substantially truncated root region a which serves for connecting to or into a bristle support or bristle body or which is part of the bristle support itself. Above the root region, the bristle 100 comprises a protruding free length l which projects past the bristle support after mounting the bristle. The free length l of the bristle 100 is divided into two main regions, a shaft region S and a flexing region F, each of which is subdivided into two sections. The shaft region S directly borders the root region a. It can comprise e.g. 15% to 85% and in particular 35% to 65% of the free length l of the bristle 100. The flexing region F joins above the shaft region S and occupies the rest of the free length l. The shaft region S is composed of a lower shaft base section b bordering the root region a and a shaft section c disposed thereabove. The shaft base section b can assume e.g. 10% to 40% of the length of the shaft region S or even be relatively short, i.e. have an axial length of $\leq$10 mm and in particular $\leq$1 mm. The flexing region F disposed above the shaft region S, which is decisive for the brushing and cleaning properties of the brush, is composed of a lower active and flexing section d bordering the shaft region S and a tip section t disposed thereabove forming the free end of the bristle 100. The flexing and active section d can assume e.g. 50% to 95% of the length of the flexing region F.

To prevent collection of impurities close to the fixing or mounting region of the bristle, the invention provides that the bristle has a continuous depression-free jacket at least in the shaft base section b. The cross-section of the bristle in the shaft base section b can thereby be circular, oval or even polygonal with rounded corners. The jacket surface is preferably smooth and without fractures or undercuts.

In the flexing region F, i.e. the active and flexing section d and/or the tip section t, at least sections of the jacket of the bristle have a profiling formed through elevations and/or depressions within an enveloping surface of the bristle which increases the brushing and cleaning effect of the bristle.

The profiling may also be formed in the shaft section c and in particular in its upper section joining the active and flexing section d. In a preferred embodiment of the invention, the cross-section of the bristle also has a continuous and depression-free jacket in the shaft section c as in the shaft base section b. It is thereby not necessary that the shaft section c and the shaft base section b have the same cross-sectional shape or cross-sectional dimensions.

To ensure stability of the bristle for a maximum service life, the invention may provide that the cross-sectional dimensions of the bristle throughout the region of its free length l, i.e. in the shaft region S and in the flexing region F do not exceed the cross-sectional dimensions in the region of the shaft base section b, and in particular of its lower cross-section at which the shaft base section b joins the root region a.

Due to the continuous depression-free jacket provided in the shaft base section b and the profiling formed in the flexing region F, the bristle has regions of different cross-sectional shape. The cross-sectional shape of the bristle in the longitudinal direction can thereby change once or several times. The bristle may consist e.g. of sequential regions with round, oval, polygonal (in particular square, triangular, rectangular or octagonal), Y-shaped, crossed or star-shaped, annular or also arc-shaped or circle segment-shaped cross-section.

In a variant, at least sections of the outer envelope of the bristle in the region of its free length l, may have the shape of a surface of a straight cylinder and/or of a cone or truncated cone. In particular, the free length l of the bristle can be formed from a sequence of regions of different geometrical shape. The regions may be e.g. cylindrical, conical, constricted (hyperboloidal) or bulged (shape of a barrel body). The transitions between the regions of differing cross-sections and/or differing geometrical shapes and the transitions between the profilings and/or between the profiling and the depression-free jacket should be smooth and as continuous as possible.

If the bristle is conical along its entire free length or at least in sections, the conicity angle should be less than 5° and in particular less than 1°. The enveloping surface diameter of the bristle can be between 0.010 mm and 10.0 mm, wherein bristles having an enveloping surface diameter of≦1.0 mm are preferred. The degree of hardness of the bristle can be determined through corresponding selection of the diameter and/or the cross-sectional shape and/or the composition of the bristle from a succession of different geometrical sections and/or through material selection.

In a preferred embodiment of the invention, the profiling is formed in the upper region of the active and flexing section d and/or in the tip section. In this connection, one single profiling may be provided. Alternatively, several similar or different profilings can be adjacent to another in the longitudinal direction of the bristle. In particular, a region with a preferably smooth, depression-free surface can be disposed between two axially separated profilings.

The surface envelope may be smooth or, in a further development of the invention, at least sections of that outer surface of the bristle may have a roughness, in particular, in the micro-range.

The profiling can be designed in various ways. In a first embodiment, the profiling comprises a groove extending around the bristle such as one single groove, which helically surrounds the bristle. It is also possible that the groove extends annularly around the bristle, substantially perpendicular to the longitudinal extension of the bristle. In this case, several grooves should be disposed, one above the other, wherein a peripheral edge, preferably sharply structured, is formed between neighboring grooves to increase the cleaning effect. The cross-section of the groove can be concavely rounded or V-shaped.

Alternatively or additionally, the profiling can comprise several elongated grooves extending in the longitudinal direction of the bristle, wherein the longitudinal grooves are preferably distributed about the circumference of the bristle and are preferably disposed next to each other. A sharp edge may also be formed between neighboring grooves in this embodiment.

The profiling may also be generated when the bristle has, in the region of the profiling, a crossed or star-shaped cross-section with several ribs which extend in the longitudinal direction of the bristle and which are distributed about the bristle circumference. The ribs may have a sharp outside edge or be rounded.

In a further embodiment, the bristle has a polygonal, in particular triangular or rectangular cross-section in the region of the profiling wherein the cross-sectional edges may be sharp or rounded.

It is also possible that two of the above-mentioned profiling types are superposed on the bristle. For example, a bristle having ribs extending in the longitudinal direction can also comprise longitudinal and/or transverse grooves, in particular, on the outer sides of the ribs.

In a particular embodiment of the bristle, preferably for use in an application brush, only the tip section t may be provided with a profiling. The geometrical cross-sectional shape of the bristle may thereby change in the tip section. Alternatively, the tip section t may be formed by axially extending fingers or comprise at least one axial profile element which projects in an axial direction of the bristle past the underlying active and flexing section d and to thereby form the tip section t.

In a further development of the invention, the bristle is composed of axially sequential sections or parts, which consist of different materials. The materials may thereby have different properties. In particular, the shaft base section b and optionally also the shaft section c may consist of a material which provides the bristle with the desired stability and rigidity while the active and flexing section d and the tip section t may be made from a material which is particularly well suited for achieving good brushing and cleaning effect and possibly also for accommodating additives in the bristle, e.g. substances for anti-microbial action. The bristle material may also be reinforced, at least in sections. This can be effected either through adding reinforcing fibers or reinforcing fiber mixtures and/or formation of a bristle core from a stable, hardening material.

The axially sequential sections or parts of the bristle, which consist of different materials, can have different colors to mark their properties. At least one of the parts may provide an indication of wear.

The free end of the bristle, i.e. the outer region of the tip section t is preferably deburred or rounded and the bristles may have a slight surface structure through addition of non-melting particles during the production process, in particular during the casting or injection molding process. The non-melting particles impair the transverse contraction during the slight shrinkage of the cooling bristles and therefore produce a slight wavy surface structure.

Moreover, at least sections of the bristle may be provided with a coating that is preferably disposed in the region of the structure and bears e.g. the additives and/or substances for antimicrobial action. The coating may provide an indication of wear.

The deformation properties of the bristle can be influenced by an inner hollow axial channel which starts from the root region a and which may supply the substances for antimicrobial action during use of the bristle. The hollow axial channel can extend through a partial region of the bristle or through approximately the entire bristle up to shortly below the free end. In a further development of the invention, the hollow channel extends through the entire bristle and opens into the tip region, i.e. is open at the tip of the bristle.

The bristle may be formed as a symmetrical body with the transition between the profiling and the unprofiled jacket being in a plane, which extends substantially perpendicular to the longitudinal axis of the bristle. A bristle of this type can be used in any direction, since its properties are the same at all angular orientations. To provide the bristle with a preferred effect in a certain radial direction and, in particular, a brushing and cleaning effect, a further development of the invention configures the transition between the profiling and the unprofiled jacket to be located in a plane which extends at an angle with respect to the longitudinal axis of the bristle. The plane is preferably within an angular range of between 30° and 60° relative to the longitudinal axis of the bristle.

To influence the stability and strength properties and, in particular, the deformation behavior of the bristle, the root region a and in particular the shaft base section b may have a jacket. The jacket moreover reliably prevents introduction of impurities. Alternatively, the entire bristle may be provided with a jacket. The jacket may thereby be part of the bristle support.

The bristles may be made from thermoplastic materials, elastomers, thermoplastic elastomers, duroplastes, silicons or other materials, which can be cast, injection-molded or compressed. Two materials may thereby border one another within a cross-section of the bristle and thereby form a multi-layer bristle (side-by-side construction).

After production, the bristles may be finished on at least part of their length in a mechanical, thermal or chemical fashion through e.g. coating, coloring, varnishing, vapor-deposition or galvanization. The bristle may also be polished, ground or roughened. The free end of the bristle can be rounded, sharpened or split. Surface finishing of the bristle may include sandblasting or exposure to laser beams to thereby provide a surface structure. Finishing may also effect a color change of the bristle, at least in sections, to visualize e.g. usage or wear conditions or effects.

Finishing may include chemical structuring or etching. If finishing is provided only on part of the bristles in particular the bristle ends, a wear indication may be provided as is particularly useful for toothbrushes and hygiene brushes.

An inventive bristle can be produced e.g. through casting, material removal, compression molding or compression. In a preferred embodiment of the invention, the bristle is produced through injection molding in particular of a thermoplastic polymer. A method may be thereby used as disclosed in WO 02/03831, the complete disclosure of which is hereby incorporated by reference.

Departing from the known injection molding method, wherein the molten polymer mass is injected under pressure into a bristle-molding channel of predetermined length and predetermined cross-sectional shape along this length, and the channel is vented during injection molding, this object is achieved in that the magnitude of the injection pressure is adjusted in dependence on the cross-sectional shape of the bristle-molding channel such that a shear flow of the molten polymer mass is generated with high core speed in the center of the molten polymer mass flow and large shearing effect due to wall friction under distinct longitudinal orientation of the polymer molecules, at least in the region of the molten polymer mass close to the wall, which is maintained along the channel, wherein the channel is simultaneously vented along its length to support maintenance of the shear flow.

This is based on the realization that the bending behavior of a monofilament can be primarily increased through generation and maintenance of a molecular orientation which has previously not been realized in injection molding of bristles, brushes and paint brushes. The molecular structure in a molten polymer mass flow can only be substantially influenced using sufficiently narrow cross-sections and melt flow forced to a speed profile having strong shearing effects to deform and stretch the energetically most favorable tension-free balled structure. For this reason, in accordance with the invention, the injection pressure is set to a sufficiently high level that a steep flow profile forms in the bristle-molding channels which is characterized by a high core speed in the center of the flow and large shearing effect in its edge region due to the wall friction of the molten polymer mass on the channel wall, wherein the shearing forces due to wall friction are larger the higher the speed difference between neighboring flow layers. A flow profile of this type with high core speed moreover ensures perfect filling of the mold of the bristle-molding channel even for the narrowest of cross-sections (small bristle diameter) and large channel length (bristle length).

The speed profile can be set in dependence on the predetermined cross-sectional shape along the length of the bristle-molding channel through a correspondingly high, optionally variable injection pressure. The polymer molecules are thereby oriented longitudinally close to the channel wall and, to a reduced degree, within the entire melt flow, wherein the magnitude of the core speed moreover prevents premature solidification of the molten mass, even for small cross-sections and large lengths. High pressure alone is not sufficient for rapid filling of a narrow molding channel. In accordance with the invention, the channel is vented along its length such that the shear flow with high flow speed is maintained up to the end of the channel and the desired longitudinal orientation of the molecules reaches the bristle tip.

Practical tests have shown that the injection pressure should be at least 500 bar ($0.5 \cdot 10^5$ kPa) and is a function of the cross-sectional dependence of the bristle-molding channel. For the quality bristles under discussion having an average bristle diameter of e.g. 0.3 (measured at half the length) and a corresponding cross-section of the bristle-molding channel and with a length of 10.5 mm, the desired speed profile can be produced with an injection pressure of at least 500 ($0.5 \cdot 10^5$ kPa). Approximately ⅔ of the above-mentioned injection pressure can usually be converted into specific pressure in the bristle-molding channel such that the molten polymer mass in the channel should have a pressure>300 bar ($0.3 \cdot 10^5$ kPa).

During solidification below the crystal melt temperature, thermoplastic materials form crystallites, which influence the modulus of elasticity (E module) and the tensile strength (tearing strength) in dependence on their shape and configuration. The formation of needle crystals has a positive influence on stiffness through increase of the E modulus and strength due to an increase of the tensile strength and initially requires linked elongated crystal seed formation on parallel molecular sections. This seed formation can be amplified compared to isothermal crystallization through the introduction of forces as given i.a. in flow processes. The inventive high injection pressure and the high flow velocity of the molten polymer mass in the bristle-molding channel obtained thereby therefore not only promote longitudinal molecular orientation but also crystal formation, wherein the high pressure simultaneously increases the packed density of the crystals through increased loading. The partial crystallization of the molecularly oriented molten mass increases the relaxation time, i.e. the molecular orientation lasts for a longer period.

The above-described effects are further supported in a supplement to the invention in which the bristle-molding channel is cooled.

The narrower the cross-section and the larger the length of the bristle-molding channel, the more reasonable it is to keep the channel walls warm to maintain the viscosity of the molten polymer mass and obtain complete filling of the mold. When setting the inventive method parameters, the filling of the mold is also guaranteed when the bristle-molding channel is cooled. Cooling of the channel and associated introduction of forces additionally promote formation of crystals and increase relaxation time. The stabilizing outer layer of the bristle, which is produced on the channel wall, permits increase of the post-pressure, which is common in injection molding. The higher the post-pressure, the stronger the crystal seed formation in the still molten bristle core. The pressure simultaneously increases the melting temperature and enhances cooling of the molten mass for a given mass temperature, thereby further producing a positive effect on the crystal growth speed and impeding relaxation of the molecules.

The high injection pressure and high flow velocity require particular or additional measures for rapid and effective venting to ensure complete mold filling and to prevent cavities in the molding channel or air inclusions in the molten mass. In the conventional injection molding methods, the bristle-molding channel is vented when the cavity is completely closed at the end of the channel or, for a longitudinally split injection mold defining the channel, in two planes parallel to the bristles. In the first case, for forming a perfect, preferably rounded bristle end, the venting must be drastically reduced to prevent molten polymer mass from getting into the venting regions. For venting parallel to the bristles, the mold-separating plane lies in the flow direction with the consequence that the molten polymer mass penetrates into even the most narrow of venting gaps and produces mold-separating seams along the bristle jacket.

The invention therefore proposes venting of the bristle-molding channel transverse to the flow direction of the molten polymer mass, wherein the venting is preferably effected in several planes transverse to the flow direction of the molten polymer mass. The number of venting planes is higher, the longer the bristle-molding channel such that, for predetermined channel length, the venting is controlled in dependence on the speed of the molten mass front. Since venting is possible in such a plane about the entire periphery of the bristle channel, there is a corresponding gap length transverse to the flow direction which is larger than that of a bristle-parallel mold-separating plane and which can be implemented over a plurality of planes.

The venting planes can be provided at equal separations along the length of the bristle-molding channel in dependence on the volume to be vented, optionally with progressive or degressive separation in the flow direction of the molten polymer mass. This permits simultaneous maintenance of a sufficiently high counter pressure in the channel to obtain uniform filling of the mold.

The bristle-molding channel can be vented merely through displacement of air through the flow pressure of the molten polymer mass. However, venting can also be supported by external under-pressure.

The inventive method permits injection of the molten polymer mass into a bristle-molding channel from the injection side with a cross-section, which is substantially uniform to produce a substantially cylindrical bristle, which could not be produced with previous injection molding technology for bristles and brushes.

The cross-section may substantially continuously taper from the injection side to produce a bristle with preferably only weak conicity, which is desired for many applications to increase the bending elasticity from the bristle root to the bristle end. Such conicity promotes maintenance or even reinforces a steep velocity profile with high core speed and shearing effect in the edge region which increases along the length such that, despite increased flow resistance, the molecular orientation and crystal formation is enhanced towards the bristle end.

Injection molding produces precisely sized bristles with a tolerance of ±3% in cross-section and in length while extruded bristles with the same constructive parameters have tolerances of ±10%. The initially circular cross-section of extruded bristles is ovalized through processing which is unnecessary for the bristles produced according to the present invention.

Injection molding technology usually regards mold removal slopes of a few degrees (>1.00°) as necessary to be able to properly remove the injection-molded part. Ejectors usually support mold removal. When the bristles are injection-molded in accordance with the above-mentioned prior art, the mold slope must be considerably larger to prevent tearing off of the bristle during removal from the mold (U.S. Pat. No. 3,256,545). This is one reason why prior art uses injection-molding tools, which have a bristle-parallel mold-separating plane, thereby accepting the above-described disadvantages. The inventive method permits reduction of the mold slope to a value of 0° with sufficient mold filling. Slender bristles of great length can be produced with relatively small conicity in the region of 0.2 to 0.50 when the positive properties of a conical bristle are desired having a bending angle, which increases towards the bristle end. Mold removal is simplified by crystal formation promoted by the longitudinal orientation and the associated increase in the tensile strength (tear resistance) of the bristle, in particular in the region close to the wall, which is important for removal from the mold. Further measures for facilitating removal from the mold are described in connection with the device.

In a further embodiment of the inventive method, the molten polymer mass is injected into an inlet region which narrows like a nozzle towards the bristle-molding channel for generating an extension flow to produce a bristle with a widened root region which optionally tapers continuously towards the actual bristle.

Such narrowing generates an extension flow, which produces considerable molecular orientation and, due to flow properties, corresponding boosting of the flow profile after the narrowing. The narrowing is therefore preferably disposed close to the injection side. It is also possible to provide narrowings along the length of the bristle-molding channel to obtain stepped bristles wherein, in this case as well, the narrowings have positive effects on the molecular structure and crystal formation.

After an optional upstream inlet region, the cross-section of the bristle-molding channel is preferably selected with a maximum width of ≦3 mm such that the injection-molded bristle has a corresponding diameter with an optionally broader root region. Bristles having this cross-section and broader root region cannot be produced through extrusion or spinning. The term "largest width" in this connection means that the bristle may also have a cross-section, which differs from a circular shape, e.g. oval, wherein the largest width of the length corresponds to the larger axis of the oval.

In applications of the inventive method, the ratio between the largest width and the length of the channel may be selected to be ≦1:5 to 1:1000, preferably up to ≦1:250. Bristles can e.g. be produced which have a length of between 15 mm and 750 mm with a maximum diameter of 3 mm in or close to the root region. The smaller the largest width, the shorter the length. For stringent requirements, e.g. for toothbrushes, application brushes etc. diameters above the root region of ≦0.5 mm are recommended which permit bristle lengths of more than 60 mm in the inventive method.

The inventive method can be modified in a likewise advantageous fashion when the molten polymer mass is injected simultaneously into several neighboring bristle-molding channels thereby forming a corresponding number of bristles such that a set of bristles can be produced in one injection process. Minimizing of the separation of the bristle-molding channels produces bristle arrangements in the form of pucks through slight compacting of the removed bristles.

The number and arrangement of the bristle-molding channels can be selected such that the entire bristle stock of a brush or of a paint brush is produced in one injection process, wherein the separations between the bristles and their geometrical relationships can be varied in accordance with the desired arrangement in the bristle stock.

A further embodiment provides that the molten polymer mass is injected into the neighboring bristle-molding channels thereby simultaneously forming a connection between at least two bristles, wherein the connection may serve for further handling of the connected bristles and also as an aid for connection to a brush body, paint brush handle or the like. Alternatively, after injection of the bristles from a polymer, a molten polymer mass of another polymer can be subsequently injected to produce a connection between the bristles. The connection may be in the form of bars, grids connecting several bristles, or the like. The use of different polymers with a joining factor of ≧20% guarantees sufficiently secure connection.

The connection may further be designed such that it forms a bristle support which may simultaneously constitute the brush body or part thereof or which can be completed into a brush body or paint brush handle by injecting at least one further molten polymer mass which may comprise a different thermoplastic or thermo elastic polymer.

In a further variant of the method, several bristles can be injected with different lengths such that, in combination with the bristle support connecting them, a complete bristle stock or partial stock can be produced for a brush or a paint brush, wherein the bristle ends are at different heights along a flat or non-planar envelope surface so that the finished brush has optimized bristle end contours.

The bristle group can also be injected with different cross-sections to permit different effects in predetermined regions of a finished brush.

Likewise, the bristle group can be injected with a cross-sectional shape, which differs along its length. The bristle group can also be injected in a mutually non-parallel fashion to produce a bristle stock with differing bristle orientations.

In accordance with another embodiment of the method, bristles having the same geometry but different bending elasticity (hardness) can be generated through injection molding of different molten polymer masses in the same molding channels. For extruded bristles for brushes having different degrees of hardness (textures) e.g. for toothbrushes having hardness gradations of soft, medium, hard, the desired degree of hardness could be influenced only via the diameter of the bristle, i.e. toothbrushes of the same structure had to prepare and process up to three different bristle diameters. The inventive method realizes these degrees of hardness merely through selection of the polymer and optionally by adjustment of the injection pressure but with identical bristle diameters.

Bristles can also be injected from a polymer or a polymer mixture, which have reduced secondary binding forces in the solidified state. These bristles can be cleaved after production through mechanical forces thereby forming flags, if necessary only after further processing into brushes or paintbrushes.

The bristles can be injected from a polymer comprising additives, which become active during use. The additives may have mechanical, e.g. abrasive effect or, e.g. for toothbrush bristles, be additives with protective, therapeutical or remineralizing action. Numerous additives of this type are known.

The invention also concerns a device for injection-molding bristles from thermoplastic polymers, comprising a means for producing the injection pressure and an injection mold which has at least one supply channel for the molten polymer mass and at least one cavity in the form of a molding channel with a mold contour which corresponds to the length and cross-sectional shape of the bristle to be produced, wherein the molding channel has associated venting means for releasing the air displaced during injection molding. Devices of this kind are known from the above-described prior art.

A device of this type is characterized, in accordance with the invention, by means for generating an injection pressure of preferably at least 500 bar ($0.5 \cdot 10^5$ kPa) and the venting means have venting cross-sections which are distributed along the length of the molding channel and which are designed to form, in cooperation with the injection pressure, a shear flow with high core speed in the center of the molten polymer mass and large shearing effect on the wall of the molding channel.

Such a device can produce bristles through injection molding as described in connection with the method. Compared to known injection molding devices for producing bristles or one-piece brushes with bristles, the device according to the invention is designed such that the desired flow dynamics is obtained in the channel forming the bristle.

The means for generating the injection pressure is preferably designed such that injection pressures of between 500 and 4000 bar ($0.5 \cdot 10^5$ to $4 \cdot 10^5$ kPa) can be set depending on the length and cross-sectional shape of the molding channel. The pressure is higher, the smaller the cross-section of the bristle to be produced and the greater its length.

The means for generating the injection pressure and venting cross-sections on the molding channel are designed with respect to construction and control such that the molten polymer mass in the molding channel has a specific pressure of at least 300 bar ($0.3 \cdot 10^5$ kPa) to 1300 bar ($1.3 \cdot 10^5$ kPa). This design is adjusted to the mass flow and flow resistances to be overcome upstream of the molding channel.

If the injection pressure on the generating means is sufficiently high, the injection pressure can advantageously be controlled depending on the length and the cross-sectional shape of the molding channel to permit injection of injection molds of different geometrical shapes with one injection-molding unit.

This purpose is supported in that the venting means have venting cross-sections, which can be controlled depending on the specific pressure.

In the inventive device, the injection mold is advantageously associated with coolant, which may be external cooling after each injection molding cycle or after removal from the mold. The molding channel in the injection mold may have associated cooling means for keeping the molding channel at a reduced temperature.

In a particularly preferred embodiment of the invention, the injection mold consists of several molding plates disposed in layers transverse to the longitudinal extension of the molding channel, each of which defines a longitudinal section of the molding channel.

In contrast to prior art with more or less block-shaped injection molds, the invention provides a structure of stacked molding plates. This structure permits forming of minimum bore cross-sections with high precision in each molding plate of low thickness. This and any other production technology would fail for larger bore depths. This is also a reason why longitudinally separated injection molds were necessary for the production of narrow cross-sections. Their disadvantages are described in connection with prior art. The inventive decomposition of the injection mold into several plates permits realization of molding channels of large length with high and reproducible precision over the entire length. The molding plates which comprise the end of the molding channels and form the bristle end can have, due to the small thickness of the molding plates, cavities with only small depth to form a bristle end having clear contours, without any mold separating seam, and without additional venting means. Oxidation of the polymer, which can be observed in narrow mold cross-sections through the so-called diesel effect, does not occur due to the small depth of the cavity.

The layered structure of the injection mold moreover permits formation of the venting means on the molding plates, i.e. with a frequency corresponding to their number. The venting means are preferably formed between the mutually facing support surfaces of the molding plates e.g. through narrow gaps or channels. The high flow velocity of the molten polymer mass perpendicular to such narrow gaps or channels prevents the molten mass from penetrating into the venting openings, despite the high pressure. The venting openings may therefore be larger than in a two-shell mold whose mold-separating plane is in the flow direction of the molten mass. The venting cross-sections may be formed with a maximum width of only a few μm up to 300 μm.

The venting means are preferably formed completely or partially through surface roughness on the mutually facing surfaces of the molding plates.

In a further advantageous embodiment, the venting means have venting cross-sections which increase outwardly from the surface of the molding channel such that the air can freely escape after passage of the narrowest point of the venting cross-sections.

The displacement of air caused by the specific pressure in the molding channel can be supported when the venting means is connected to an external under-pressure source.

The device may be designed such that the molding channel has a cross-section which is substantially constant along its length or which substantially uniformly tapers towards its end to produce cylindrical or slightly conical bristles.

Practical injection tests under the stated method conditions have shown that the molding channel can taper at an angle <1.0°, with linear axis, to produce sufficient mold slope for removing a slightly conical bristle, having excellent bending behavior, from the mold.

The molding channel can have a cross-section, which discontinuously tapers towards the end to produce specially designed bristle ends as required by the application for the finished brush.

The largest width of the cross-section of the molding channel is preferably $\leq 3$ mm. This covers the bristle cross-sections desired for quality brushes and paintbrushes.

At least one molding plate can be disposed on the injection side having a widening which tapers towards the molding channel and can be connected upstream of the molding plates defining the molding channel having the above-mentioned largest width at their sides facing the supply channel to reinforce the cross-section on the bristle root and on the bristle base and also to obtain, due to this widening, an extensional flow at the inlet region of the molding channel to support formation of the desired flow dynamics. The widening can narrow like a trumpet towards the molding channel to produce a smoothly connecting shoulder at the bristle and to the support connecting the bristles, brush body or the like. This is particularly important for hygiene brushes of any type.

The ratio between the largest width of the cross-section of the molding channel and its length is preferably between 1:5 and 1:250 but may also be 1:1000 wherein the ratio is closer to the higher value the narrower the cross-section of the molding channel and closer to the lower value the larger the narrowest cross-section.

A further embodiment of the invention provides that the number and thickness of the molding plates is matched to the length of the molding channel, wherein the number of the molding plates is inversely proportional to the ratio between the largest inner diameter of the cross-section and the length of the molding channel. The number of molding plates, which belong to an injection mold, can be variable to be able to produce bristles of varying length with the same mold.

The molding plates preferably have a thickness, which is approximately three to fifteen times the central diameter of the molding channel. For a bristle of an average diameter of 0.3 mm and a length of 10.5 mm, the molding plates have e.g. a thickness of 1.5 mm to 2.00 mm. A longitudinal section of the molding channel of 1.5 mm to 2.0 mm can be drilled with high precision into the molding plate.

The molding plates are movable perpendicular to their plate plane, individually or in groups. This permits, in particular, removal of the bristle from the mold in a non-conventional fashion, wherein e.g. the molding plates, starting with the molding plate having the mold contour at the end of the molding channel and ending with the molding plate facing the supply channel, can be subsequently removed either individually or in groups.

The molding plates are reliably kept together under the method-specific high closing pressure of the injection-molding machine and are not subjected to any deforming forces, despite their low thickness. Moreover, the venting openings are kept closed by the closing pressure and, unlike channels with longitudinal venting, require no additional means to keep them closed.

Practical tests have shown that the inventive narrow cross-sections and channel lengths require considerable extraction forces to release the bristles if e.g. only two molding plates are present. The bristle usually breaks. Increasing the number of plates and their successive separation from each other permits damage-free removal of the bristle from the mold, in particular when the molding plate facing the supply channel is removed last. During removal from the mold, the edges of the holes of each molding plate function as drawing nozzles to flatten any "polymer skin" formed in the mold-separating plane without disadvantageously affecting the bristle jacket. In any event, the bristle ends are perfectly formed.

Individual molding plates may be displaceable parallel to the neighboring molding plates to exert transverse loading on the bristle after injection molding, thereby optimizing the molecular structure.

In a further preferred embodiment, the injection mold has molding channels of different length and/or different cross-sectional shape to obtain e.g. a bristle stock of the desired geometry and configuration in one injection molding cycle.

In accordance with a further embodiment, the injection mold has molding channels comprising a central axis which extends at an inclined angle relative to the direction of motion of the molding plates, wherein each molding plate comprises a longitudinal section of the molding channel with a length which permits removal from the mold through successive removal of the individual molding plates, despite the angle variation.

The subdivision of the injection mold into a plurality of molding plates extending transverse to the molding channel permits subdivision of the molding channel into longitudinal sections which nevertheless permit removal of the individual longitudinal sections from the mold without excessive strain on the bristle or deformation thereof even when the bristle axis is inclined relative to the direction of motion of the molding plates (removing direction). In this fashion, bristle groups can be produced in one single injection mold, wherein the bristles extend parallel to each other but at an angle relative to a bristle support connecting them or which have different angle orientations relative to each other.

In accordance with a further embodiment, the injection mold has molding channels with a central axis which is curved relative to the direction of motion of the molding plates, wherein each molding plate defines a longitudinal section of the molding channel which is dimensioned such that removal form the mold is possible through successive lifting of individual molding plates in dependence on the curvature.

Wavy bristles can thereby be produced which can also be easily removed from the mold. It is also possible to simultaneously produce straight, wavy and curved bristles in one single injection mold.

In a further embodiment, the injection mold has at least one molding plate which can be displaced in its plane relative to the neighboring molding plates after injection-molding of the bristles to form, together with these, a clamping means for all the bristles which acts on the corresponding portion of the length of the molding channel.

The invention thereby permits use of parts of the injection mold to grasp the injected bristles and fix them in the injection mold along a portion of their length e.g. to separate the molding plates close to the ends, in the removal direction, from the remaining molding plates and to carry along the bristle blanks such that the bristles are exposed along a middle partial length, i.e. between these molding plates and the remaining molding plates. Subsequent displacement of the clamping molding plates and return of the molding plates close to the end in the direction towards the injection end of the bristles, causes these ends to project past the molding plate at the injection side. Through transfer of the injection mold, optionally under further clamping by the holder, the injection mold can be connected to another injection molding tool, which has a mold cavity forming a bristle support or brush body. In a further injection molding process, the projecting ends are surrounded by a further molten polymer mass, which fills this mold cavity.

The clamping means may also serve as a transport holder to transfer the clamped bristles, after removal from the other molding plates, into another work station for connection to a brush body. This is also possible when the bristles are already joined via a connection such as e.g. bridges, grids or bristle supports. The clamping molding plate is then located close to the transition between bristles and bristle support and the holder is removed in the removal direction along with the connection and subsequently transferred, wherein the molding plates which serve as holders are replaced by an equivalent set of molding plates to again obtain a complete injection mold. The holder can be a portable holder moving in a circulating path and be reused after complete removal of the bristles from the holder to complement the injection mold. If the connection is not directly required for the subsequent fabrication steps, e.g. insertion, gluing, welding, injecting etc. it can also be removed and only the bristles may be connected to the bristle support or brush body using any conventional joining technique.

A further embodiment of the invention provides that the injection mold consists of at least two groups of molding plates comprising clamping means of which the first group comprises part of the molding channel including the end and the further groups comprise the remaining part of the molding channel, wherein the first group can be removed from the second group and the subsequent groups can be removed from each other, in temporal sequence. The injection process is divided into a number of injection molding cycles corresponding to the number of groups such that, in the closed initial position of the injection mold, the molten polymer mass is injected in a first injection cycle into the complete molding channel, whereupon the first group can be removed from the further groups thereby carrying along the blank via the clamping means, with the withdrawal path being shorter than the length of the blank. Subsequently, in a second injection molding cycle, more molten polymer mass is injected into the released longitudinal section of the molding channel of the further groups and the steps injection/removal are repeated until the second to last group is removed from the last group to produce bristles of a length greater than the length of the molding channel. The bristle is produced in sections, which permits production of bristles of greater lengths.

In this embodiment of the device, a different molten polymer mass can be injected in each injection cycle to produce a bristle which has several components along the bristle length, wherein the polymers used in each step can be matched to the requirements of the bristle and connection to the bristle support thereby producing a bristle with several regions. The removal motions of the individual groups can be matched, in short time intervals, to the injection molding cycle, wherein the blank is sufficiently cooled that it is removed from the remaining molding plates during the withdrawal motion. The individual regions are preferably bonded together but may also be connected in a positive or non-positive manner through corresponding profiling of the end of the last injected partial length.

The molding plate comprising the bristle end and the mold contour at the end of the molding channel can preferably be replaced with a molding plate having a different mold contour for producing bristles with ends of different shapes. This molding plate should only have smooth contours to permit faultless removal from the mold of the bristle end, which is important for the respective use.

In this fashion, the end contour of the bristles can be varied for otherwise constant geometry of the bristles, e.g. have pointed or variably rounded ends or even to produce bristles with forked-ends (two tips or the like). This molding plate may have longitudinal molding channel sections of different depths to form a contoured envelope surface for the bristle ends of a bristle stock.

A mold cavity, which connects two or more molding channels, is preferably disposed between the supply channel and the molding channels of the injection mold for forming a connection among the bristles which can optionally also connect all bristles. It can serve either as an auxiliary means for further handling of the entire bristle stock or as an auxiliary means for completing the bristle stock with a brush body.

The mold cavity can also be designed to produce a brush or paintbrush body or part thereof.

In particular, the mold cavity can thereby be formed from different polymers for producing a brush or paintbrush body or part thereof in a multiple component design.

BRIEF DESCRIPTION OF THE DRAWING

The invention is described below with reference to embodiments shown in the drawing.

FIG. 5A shows a side view of a further embodiment of a bristle;

FIG. 5B shows the section VB-VB of FIG. 5A;

FIG. 5C shows the section VC-VC of FIG. 5A;

FIG. 18A shows an alternative embodiment of a bristle with an inner hollow channel;

FIG. 18B shows a top view of the bristle of FIG. 18A;

FIG. 19A shows a modification of the bristle of FIG. 18A;

FIG. 19B shows a top view of the bristle of FIG. 19A;

FIG. 21A shows a side view of the free end of a bristle with an axial profiled element;

FIG. 21B shows a top view of the bristle of FIG. 21A;

FIG. 21C shows a top view corresponding to FIG. 21B with a first alternative profiled element;

FIG. 21D show a top view corresponding to FIG. 21B with a second alternative profiled elements;

FIG. 21E show a top view corresponding to FIG. 21B with a third alternative profiled elements;

FIG. 21F show a top view corresponding to FIG. 21B with a fourth alternative profiled elements;

FIG. 21G show a top view corresponding to FIG. 21B with a fifth alternative profiled elements;

FIG. 21H show a top view corresponding to FIG. 21B with a sixth alternative profiled elements;

FIG. 21I show a top view corresponding to FIG. 21B with a seventh alternative profiled elements;

FIG. 21J show a top view corresponding to FIG. 21B with a eighth alternative profiled elements;

FIG. 21K show a top view corresponding to FIG. 21B with a ninth alternative profiled elements;

FIG. 21L show a top view corresponding to FIG. 21B with a tenth alternative profiled elements;

FIG. 21M show a top view corresponding to FIG. 21B with a eleventh alternative profiled elements;

FIG. 29 shows a schematic longitudinal section through an embodiment of an injection mold in a first operational phases;

FIG. 30 shows a schematic longitudinal section through an embodiment of an injection mold in a second operational phases;

FIG. 31 shows a schematic longitudinal section through an embodiment of an injection mold in a third operational phases;

FIG. 35 shows a schematic longitudinal section through a modified embodiment of an injection mold in a first operational phases;

FIG. 36 shows a schematic longitudinal section through a modified embodiment of an injection mold in a second operational phases;

FIG. 37 shows a schematic longitudinal section through a modified embodiment of an injection mold in a third operational phases;

FIG. 38 shows a schematic longitudinal section through a modified embodiment of an injection mold in a fourth operational phases;

FIG. 39 shows a schematic longitudinal section through a modified embodiment of an injection mold in a fifth operational phases;

FIG. 44 shows a longitudinal section through an injection mold in a further modified embodiment in a first operational phases;

FIG. 45 shows a longitudinal section through an injection mold in a further modified embodiment in a second operational phases;

FIG. 46 shows a longitudinal section corresponding to FIG. 44 with a contoured displacement plate;

FIG. 47 shows a longitudinal section corresponding to FIG. 45 with a contoured displacement plate;

FIG. 48 shows a longitudinal section corresponding to FIG. 44 with another form of injection molding;

FIG. 49 shows a longitudinal section corresponding to FIG. 45 with another form of injection molding;

DESCRIPTION OF THE PREFERRED EMBODIMENT

Figure 1:
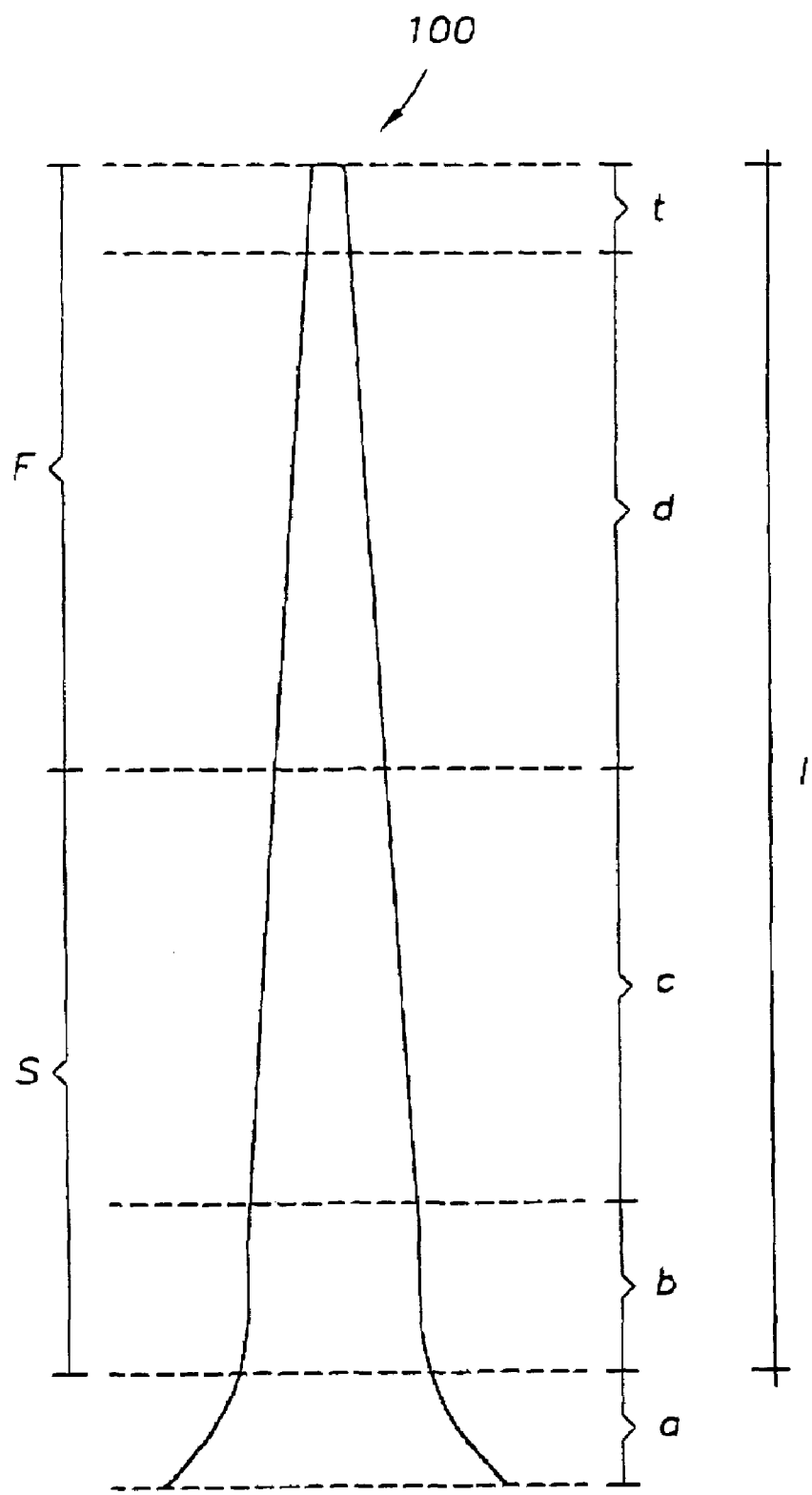
FIG. 1 shows a schematic view of a bristle defining the bristle regions and sections.
Figure 2A:
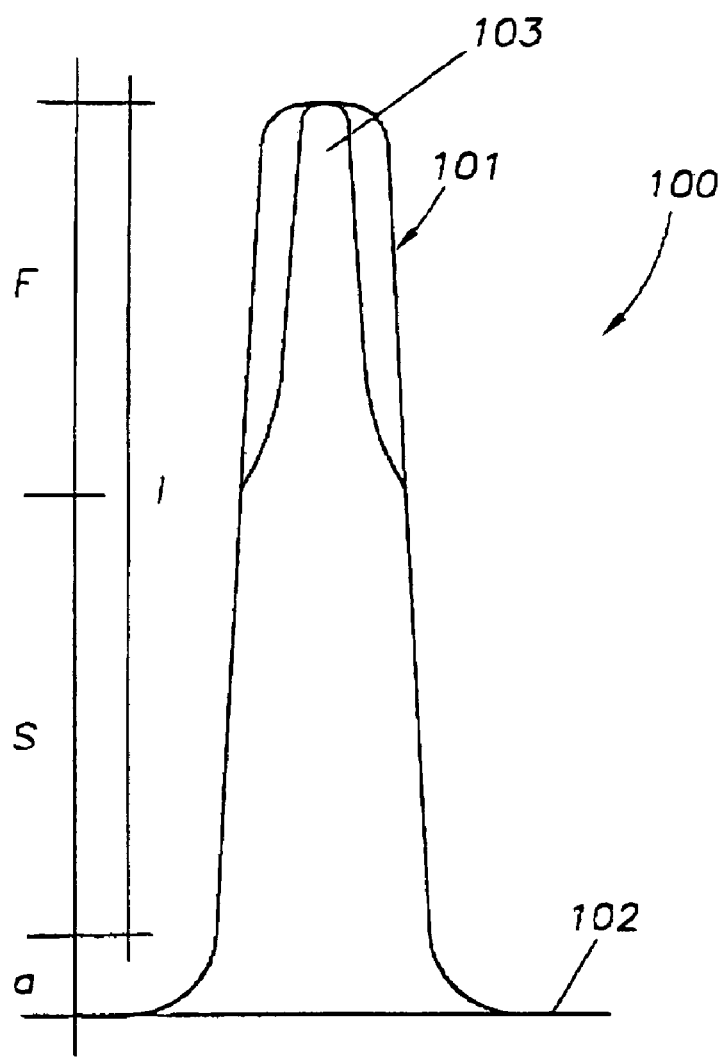
FIG. 2A shows a highly enlarged schematic view of a bristle in accordance with a first embodiment.
Figure 2B:
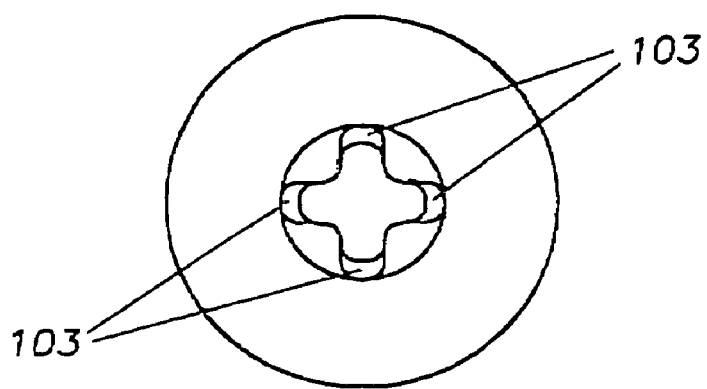
FIG. 2B shows a top view of the bristle of FIG. 2A.

FIGS. 2A and 2B show one individual bristle 100 which can be used in particular for hygiene brushes, e.g. toothbrushes, cleaning brushes in the medical field or in hospitals or also as cleaning or application brushes in the food industry. The root region a of the bristle 100 has a trumpet-like downward facing widening with concave rounded flanks thereby providing good mounting to a surface 102 of a brush body. Along its free length L, the bristle 100 has a conically tapering enveloping surface wherein the shaft region S has a circular cross-section with a continuous, smooth depression-free jacket along its entire length. A profiling 101 is formed in the flexing region F, with the bristle 100 having a crossed cross-section in this location (see FIG. 2B) to form four axial ribs 103 which are distributed about the circumference, which are rounded at their outer sides, and which extend up to the free end of the bristle 100. A smooth, continuous transition is provided between the outer side of the ribs 103 and the surface of the shaft region S. The bristle 100 is rounded in the region of its free end.

Figure 3A:
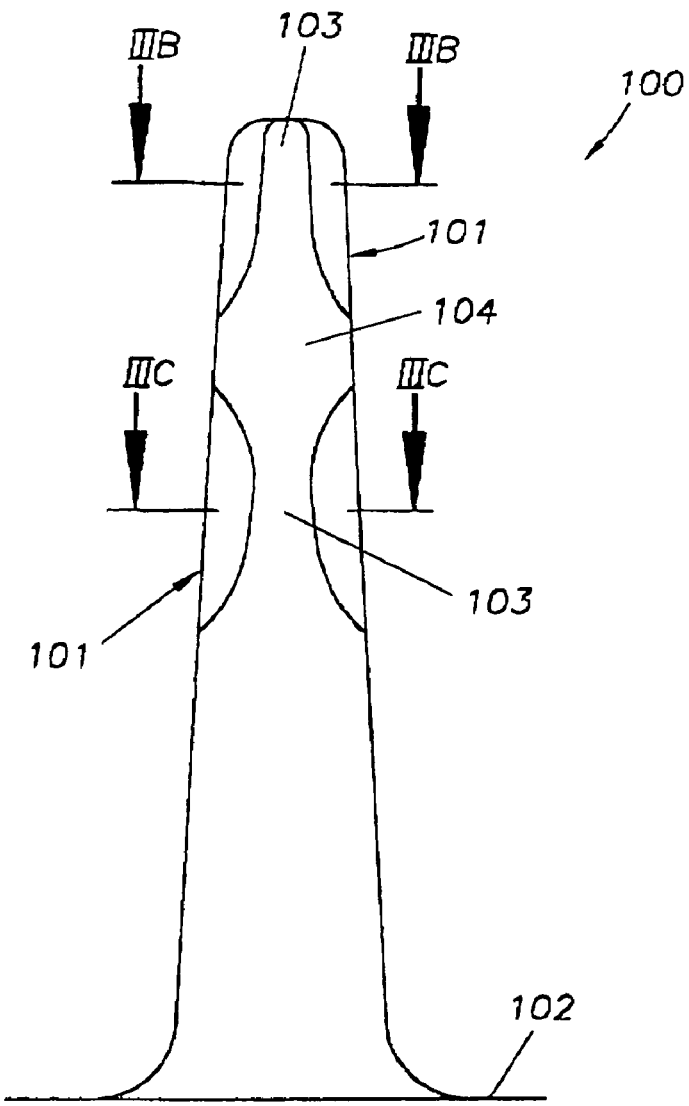
FIG. 3A shows a view of a bristle which is modified compared to FIG. 2A.
Figure 3B:
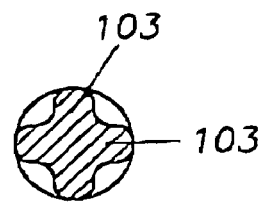
FIG. 3B shows the section IIIB-IIIB of FIG. 3A.
Figure 3C:
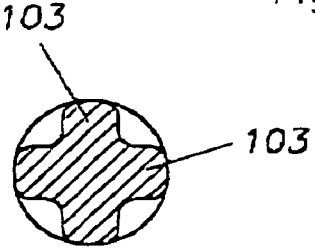
FIG. 3C shows the section IIIC-IIIC of FIG. 3A.

FIGS. 3A, 3B and 3C show a further development of the bristle of FIG. 2A which differs therefrom only in that the ribs 103 forming the profiling 101 are connected to a central section 104 having a peripherally smooth, continuous and depression-free surface to form two axially separated profilings 101 of the above mentioned type between which the central section 104 having a smooth depression-free jacket is disposed. The surface of the ribs 103 merges smoothly and continuously into the depression-free jacket of the section 104 or shaft region.

Figure 4A:
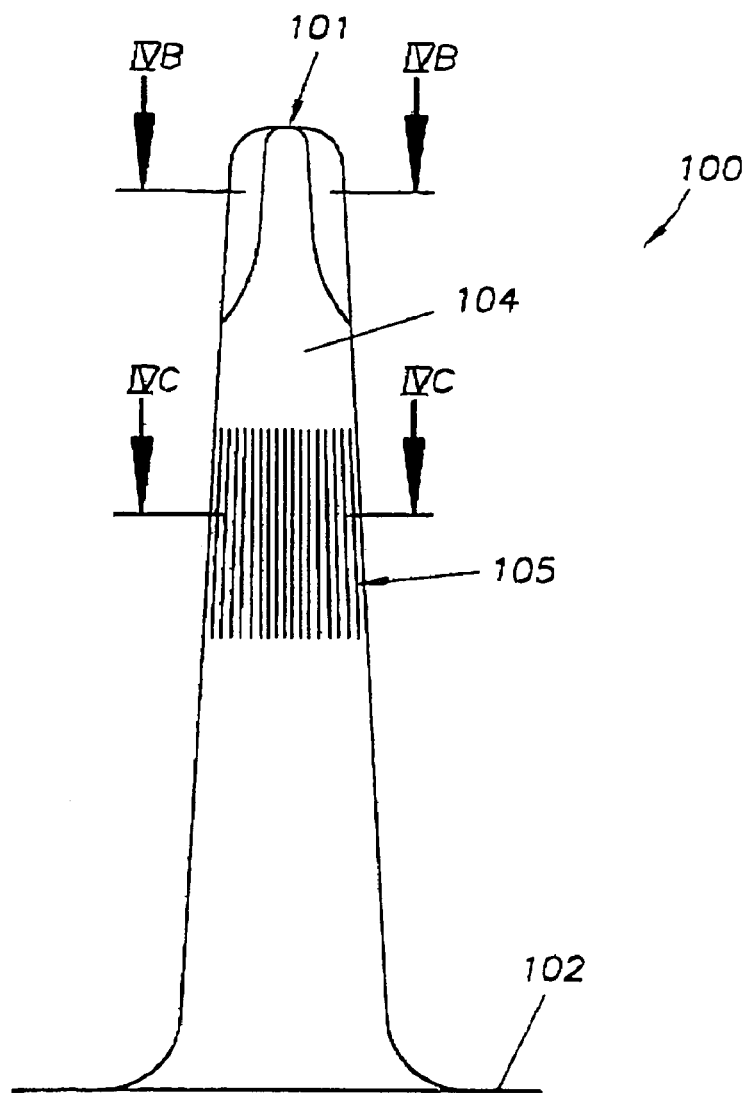
FIG. 4A shows a side view of a further embodiment of a bristle.
Figure 4B:
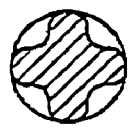
FIG. 4B shows the section IVB-IVB of FIG. 4A.
Figure 4C:
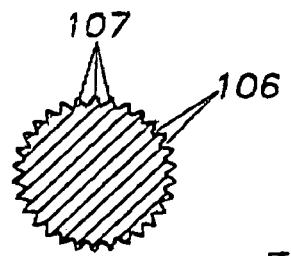
FIG. 4C shows the section IVC-IVC of FIG. 4A.

The upper region of the active and flexing section and the tip section of the bristle 100 of FIGS. 4A, 4B and 4C have the above-mentioned profiling 101 with crossed cross-section (FIG. 4B). A section 104 with smooth, depression-free envelope is disposed below the profiling 101. A further profiling 105 is formed below this section 104, which comprises a plurality of axially extending grooves 106 which are closely disposed next to each other about the periphery of the bristle. A sharp edge 107 is formed between two neighboring grooves 106 (FIG. 4C).

The bristle 100 of FIGS. 5A, 5B and 5C differs from the bristle of FIG. 4A in that the profiling 108 is an arrangement of several horizontal grooves 109 which extend about the periphery of the bristle, each of which having a V-shaped cross-section, wherein a circumferential, sharp radial edge 110 is formed between each of the stacked grooves 109.

Figure 6A:
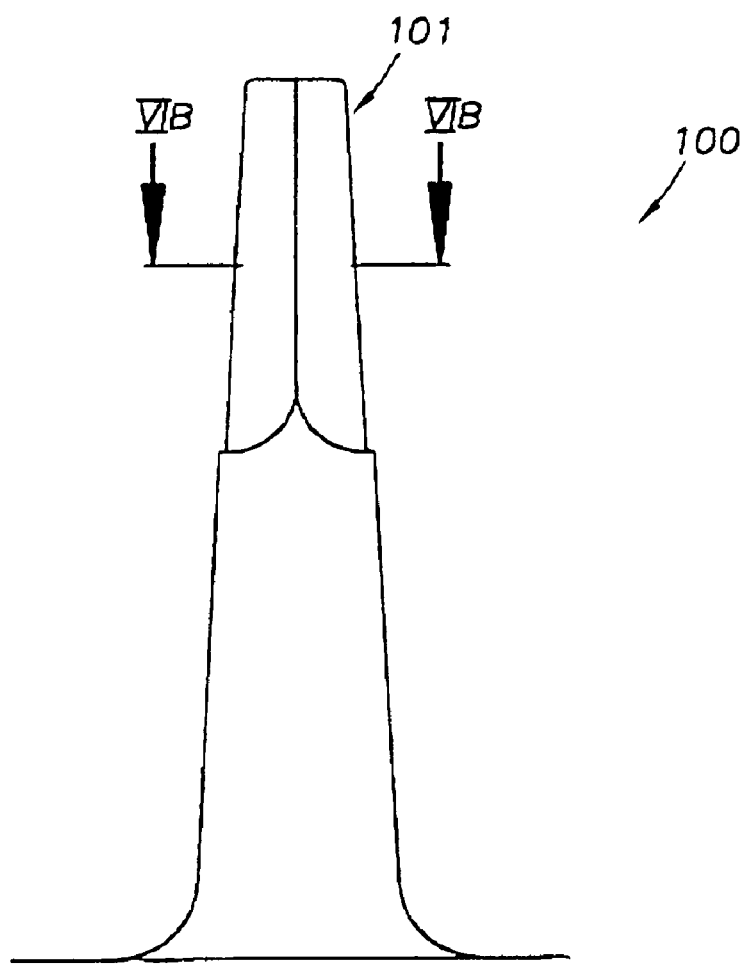
FIG. 6A shows a view of a further embodiment of the bristle.
Figure 6B:
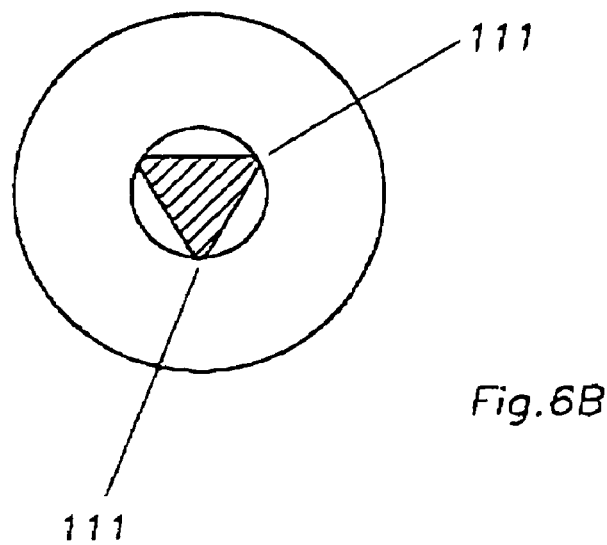
FIG. 6B shows the section VIB-VIB of FIG. 6A.

FIGS. 6A and 6B show a modification of the bristle according to FIG. 2A and differ from this figure in that the profiling 101 has a triangular cross-section instead of a crossed cross-section (see also FIG. 6B) to create three sharp axial edges 111 which are distributed about the circumference of the bristle. The triangular cross-section extends up to the free end of the bristle 100.

Figure 7A:
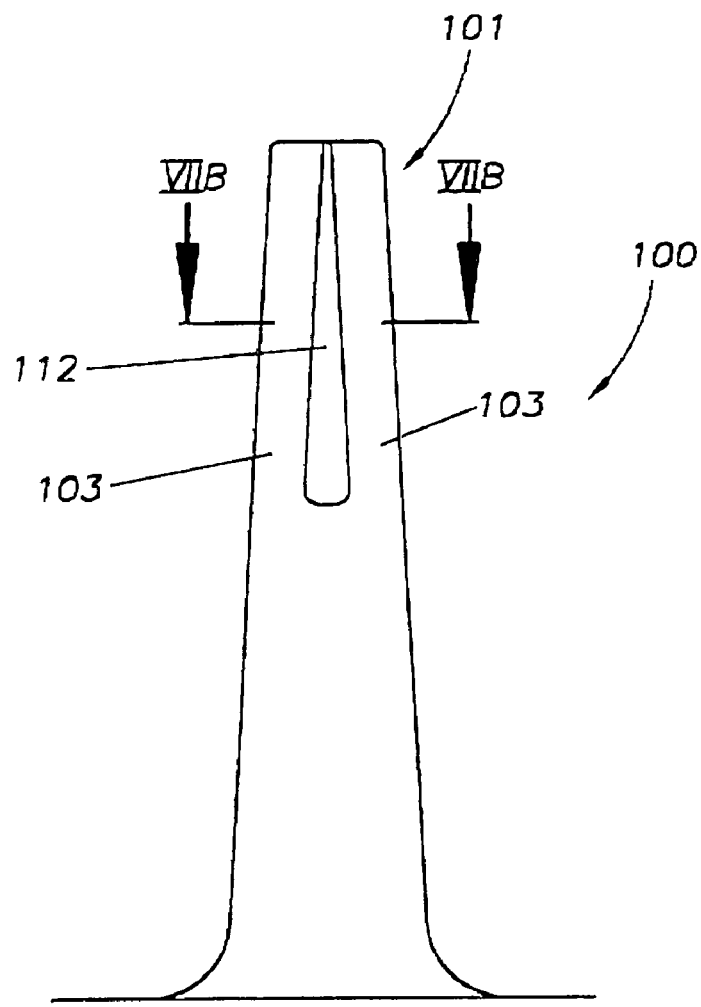
FIG. 7A shows a view of a further embodiment of the bristle.
Figure 7B:
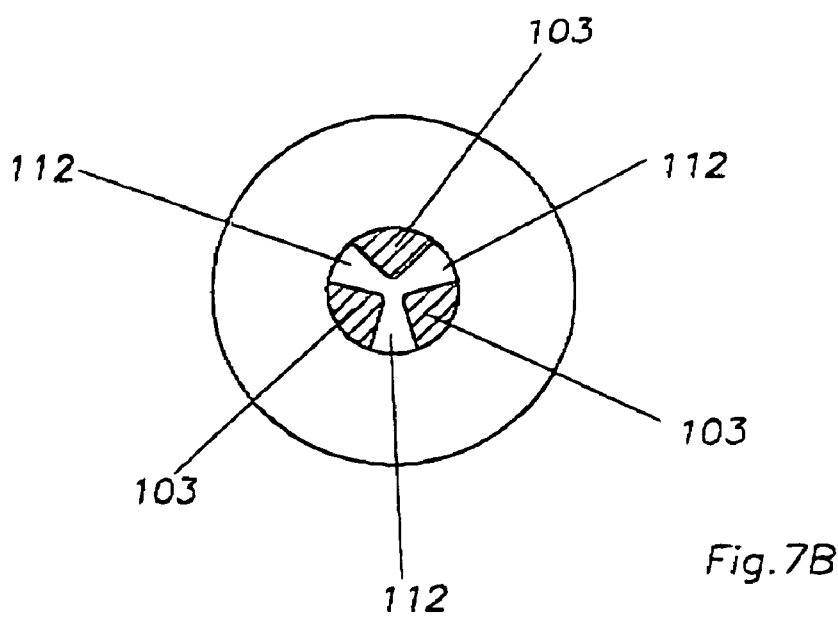
FIG. 7B shows the section VIIB-VIIB of FIG. 7A.

FIGS. 7A and 7B show a further alternative of the cross-sectional design of the profiling. In accordance with this embodiment, the profiled region 101 of the bristle 100 has a cross-section formed by three axially upwardly protruding ribs 103 wherein each rib has the cross-sectional shape of a segment of a circle and a gap 112 is formed between the ribs 103 such that the ribs 103 are only connected to each other in the base region.

Figure 8A:
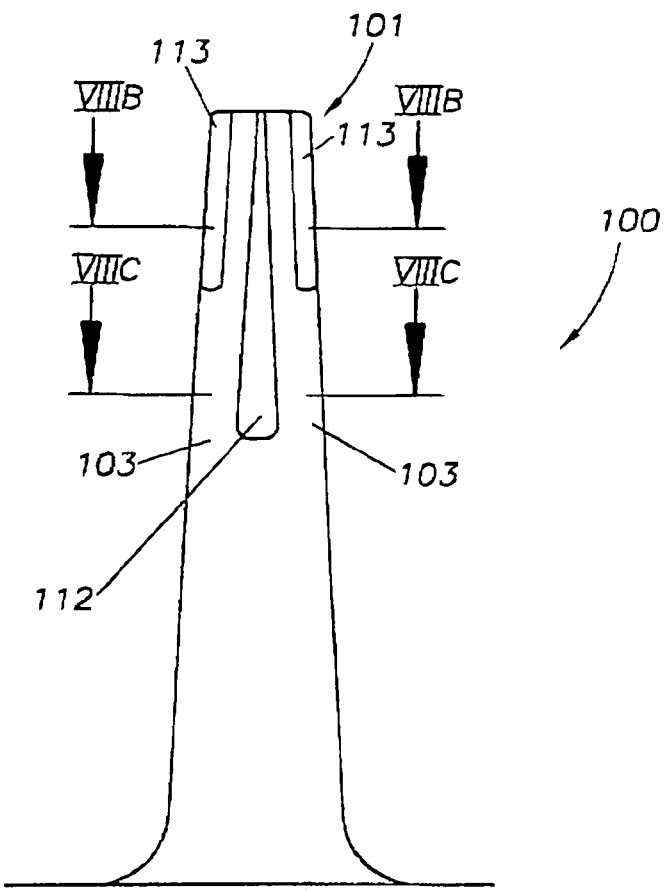
FIG. 8A shows a modification of the bristle of FIG. 7A.
Figure 8B:
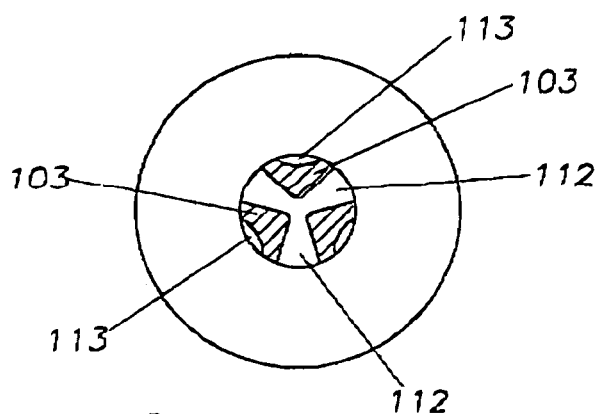
FIG. 8B shows the section VIIIB-VIIIB of FIG. 8A.
Figure 8C:
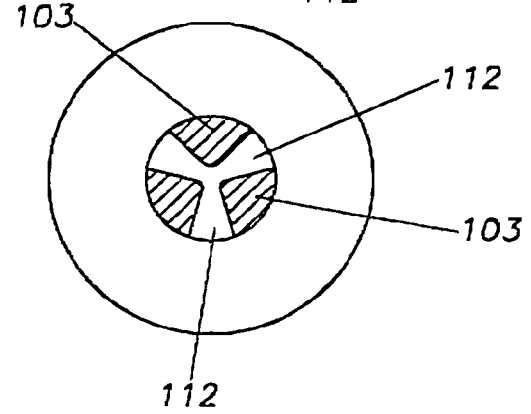
FIG. 8C shows the section VIIIC-VIIIC of FIG. 8A.

FIGS. 8A, 8B and 8C show a further development of the embodiment of FIG. 7A which differs therefrom only in that the ribs 103 have an external recess 113 of concave cross-section in an upper partial region of their axial length which extends in the longitudinal direction of the bristle 100 up to the upper free end of the bristle 100.

Figure 9:
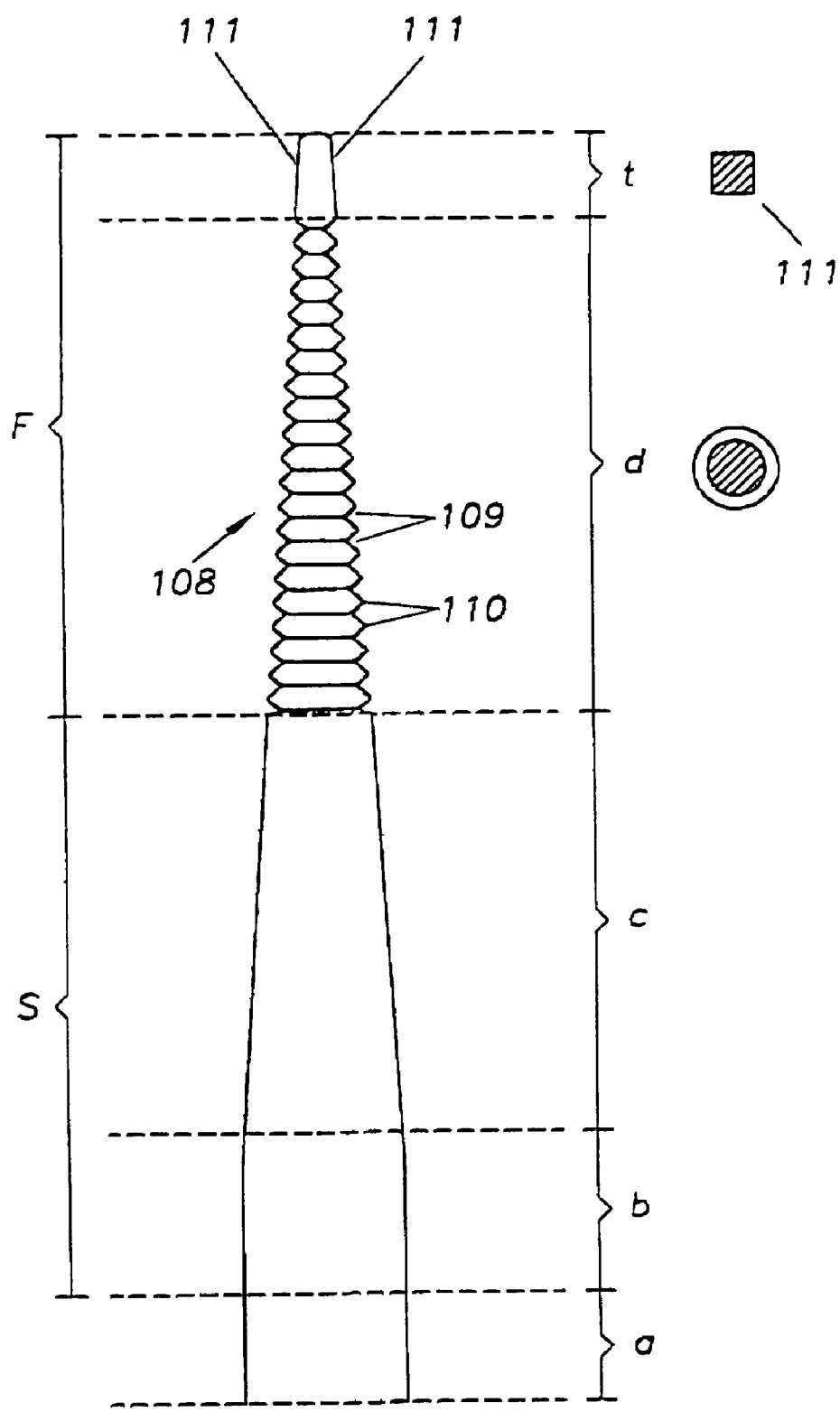
FIG. 9 shows an alternative embodiment of the bristle.

In all of the above-mentioned embodiments, the bristle has a cross-section, which tapers continuously towards the tip. The cross-sectional dimensions of the bristle in the region of its free length do not exceed the cross-sectional dimensions of the lower portion of the shaft base section b where the bristle merges into the underlying root region a. FIG. 9 shows one embodiment in which the shaft base section b has a cylindrical shape and the sections disposed above, i.e. the shaft section c of the active and flexing section d and the tip section t, taper towards the top. The entire active and flexing section d has a profiling 108 which is formed by a plurality of horizontal grooves 109 extending around the bristle 100 with intermediate sharp circulating edges 110. FIG. 9 shows that the bristle has a circular cross-section in the region of the active and flexing section d and its upper tip section t has a square cross-section to form four sharp axial edges 111.

Figure 10:
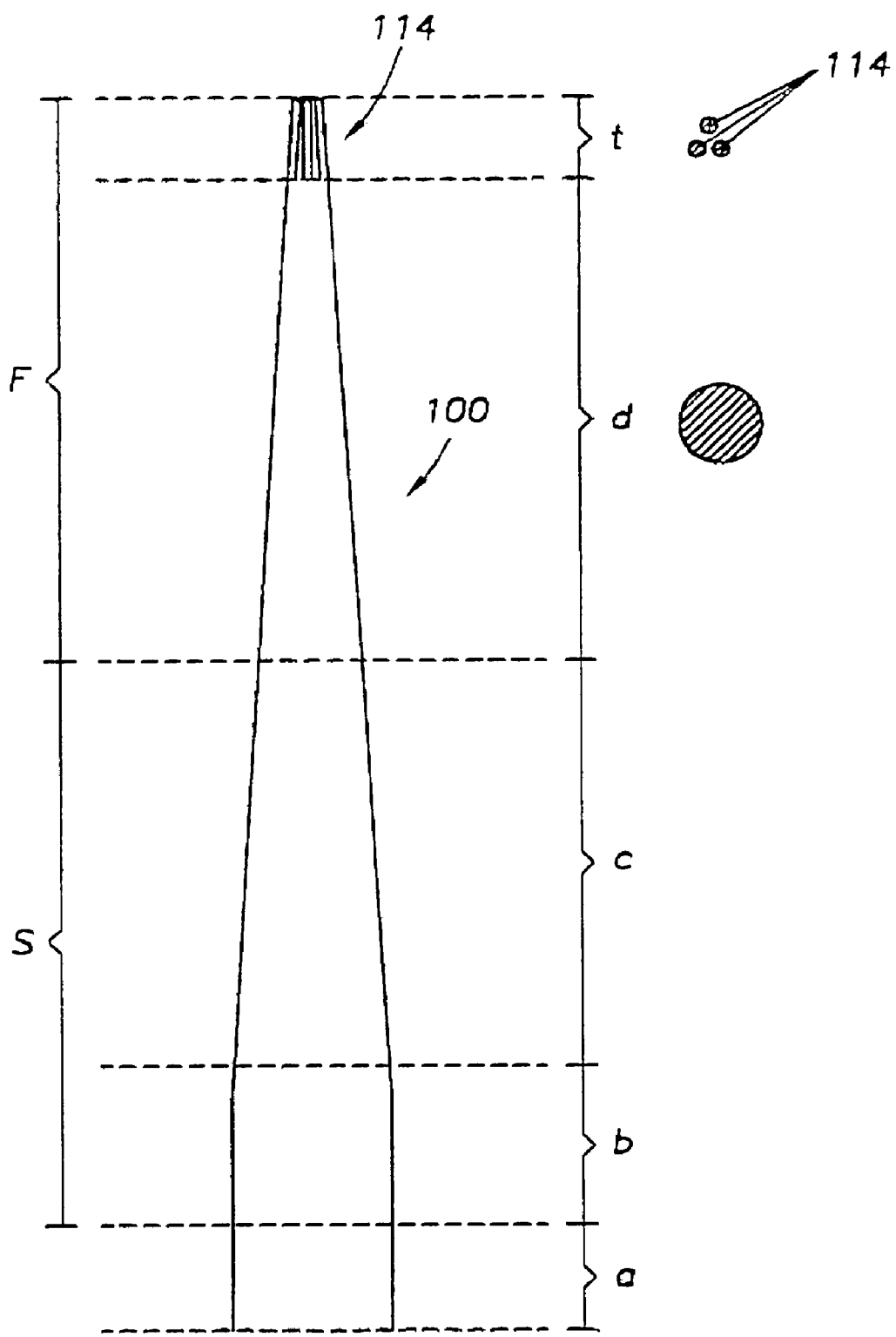
FIG. 10 shows a bristle in particular for an application brush.

The bristle 100 of FIG. 10 has a circular cross-section with smooth depression-free envelope throughout its overall shaft region S and its active and flexing section d, wherein the shaft section c and the active and flexing section d are conical. Three contiguous fingers 114 which extend axially in an upward direction form the tip section t. In this embodiment, three fingers are provided which are disposed at the corners of a substantially equilateral triangle.

Figure 11:
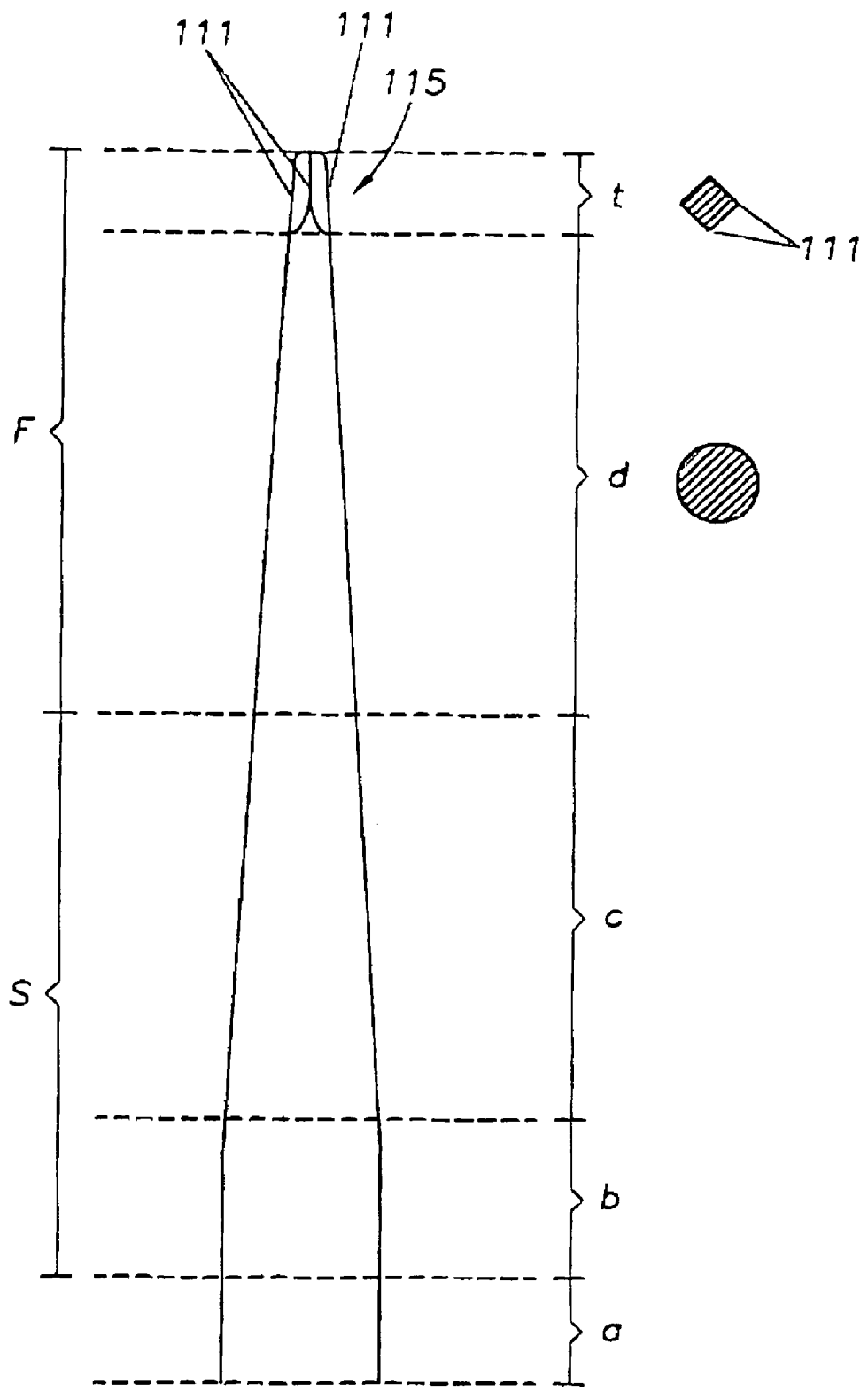
FIG. 11 shows a bristle with profiled tip section t.

The bristle 100 of FIG. 11 differs from the bristle of FIG. 10 with respect to the design of the tip section t. Instead of the fingers 114, the tip section t now has a profiling 115 in the form of a square or rhombic cross-section to form four sharp axial edges 111. The bristle has no profile outside of the tip section t and has a smooth depression-free jacket.

Figure 12:
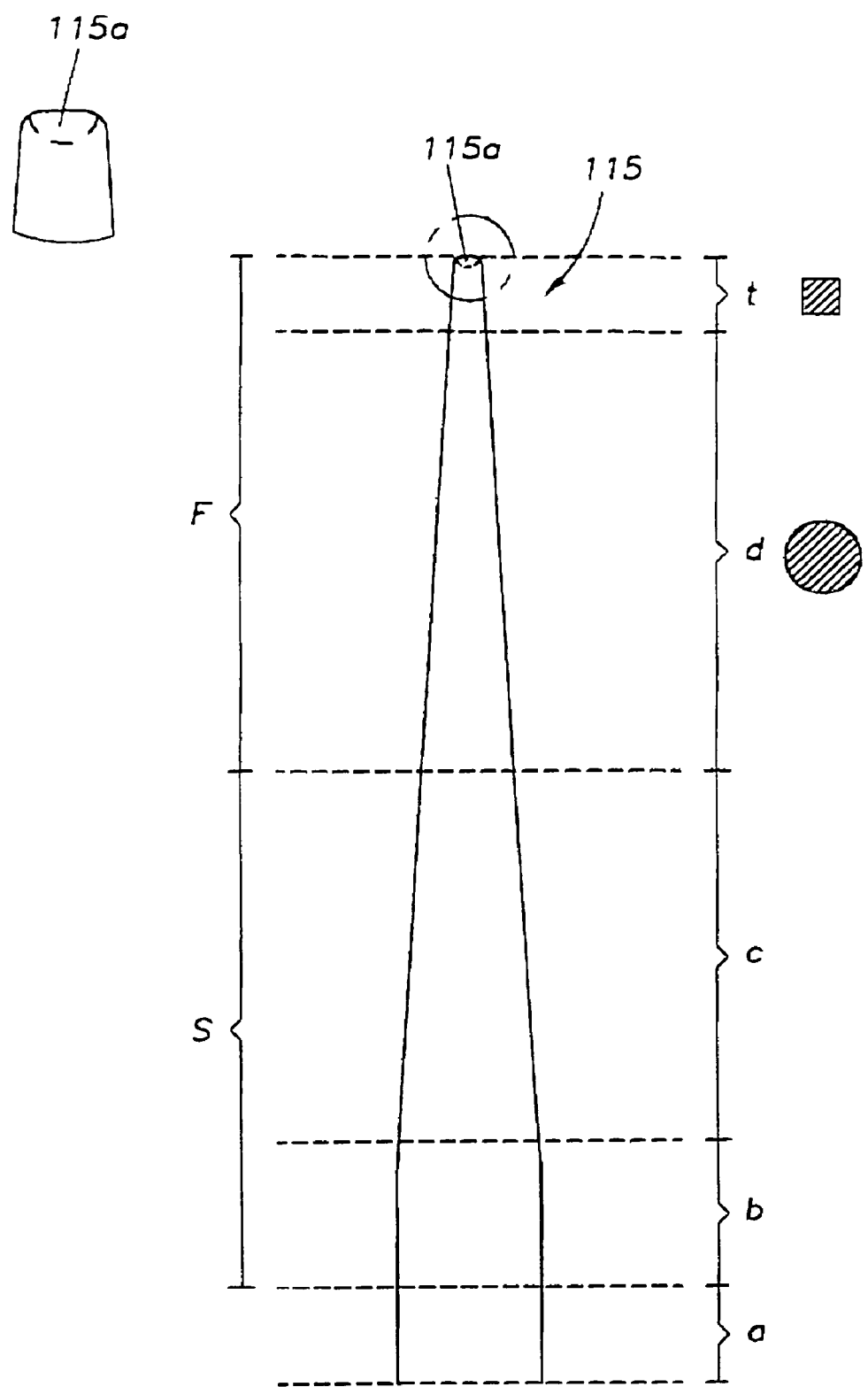
FIG. 12 shows a further embodiment of the bristle.

While in the embodiment of FIG. 11, the entire tip section t has a profiling 115, FIG. 12 shows a design having an upwardly facing recess 115*a* with concave cross-section which is additionally formed on the free end of the bristle and whose circumferential edge serves as an additional profiling.

Figure 13:
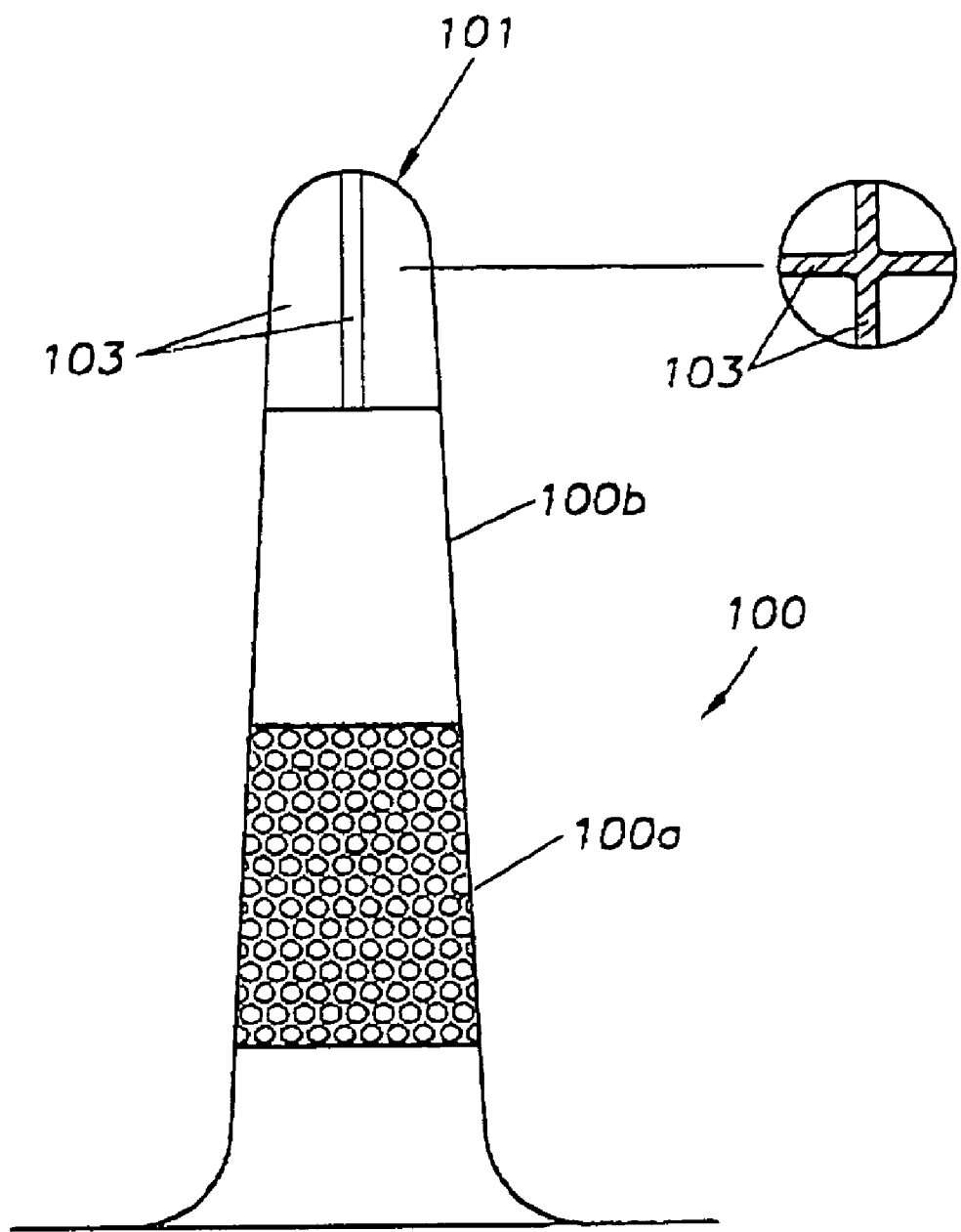
FIG. 13 shows a bristle formed from parts of different materials.

FIG. 13 shows a bristle 100 which is formed of axially sequential sections or parts 100*a* and 100*b* of different materials. A first section 100*a* thereby forms the shaft section s, i.e. the shaft base section b and the shaft section c and consists of a foamed material, which may have a certain surface roughness. A second section 100*b* is provided thereabove, which forms the active, and flexing section d and the tip section c and which consists of non-foamed material. The tip section t and the upper region of the active and flexing section d has a profiling 101 in the form of a crossed cross-section with four ribs 103 distributed about the periphery of the bristles.

Figure 14:
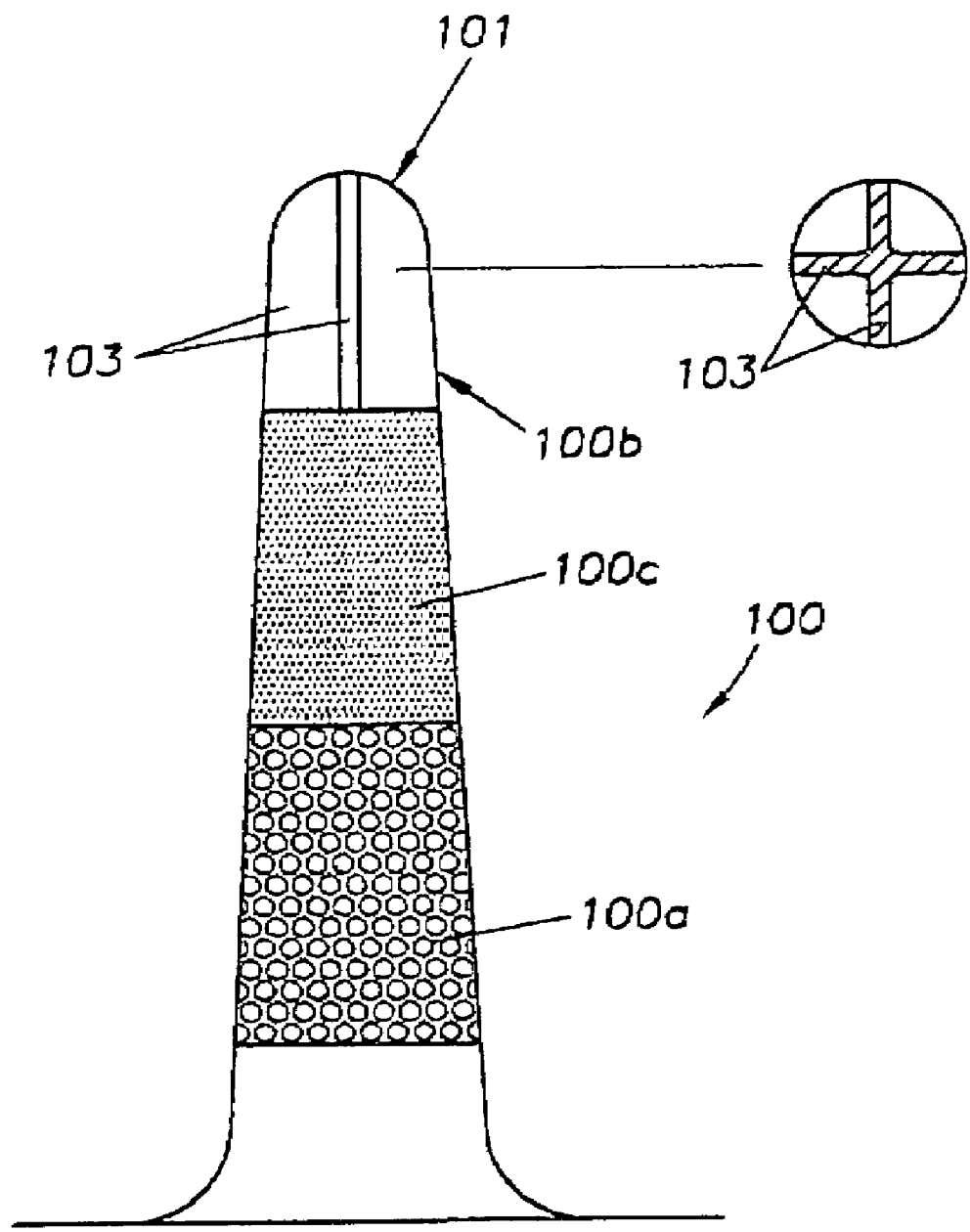
FIG. 14 shows a further development of the bristle of FIG. 13.

FIG. 14 shows a further development of the bristle of FIG. 13 having a third section 100*c* which forms the active and flexing section d, which consists of a material filled with an additive or substance for antimicrobial action, and which may also have a certain surface roughness.

Figure 15A:
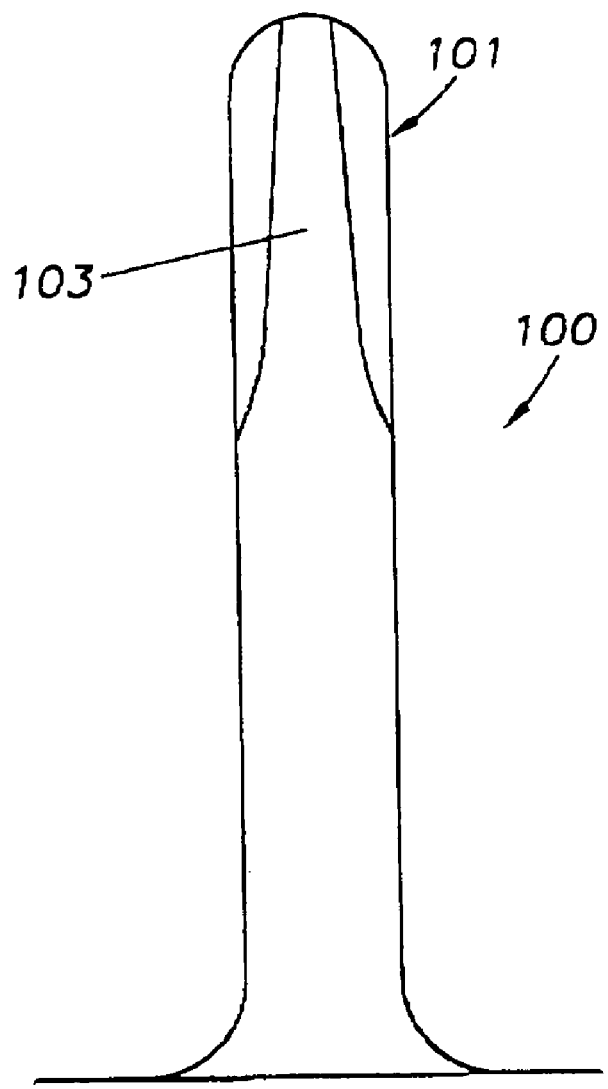
FIG. 15A shows a side view of a bristle with cylindrical enveloping surface.
Figure 15B:
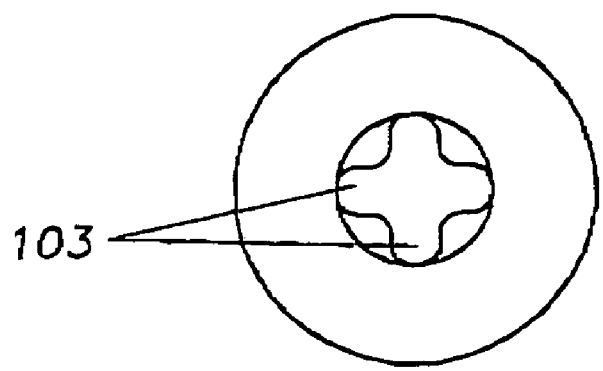
FIG. 15B shows a top view of the bristle of FIG. 15A.
Figure 16A:
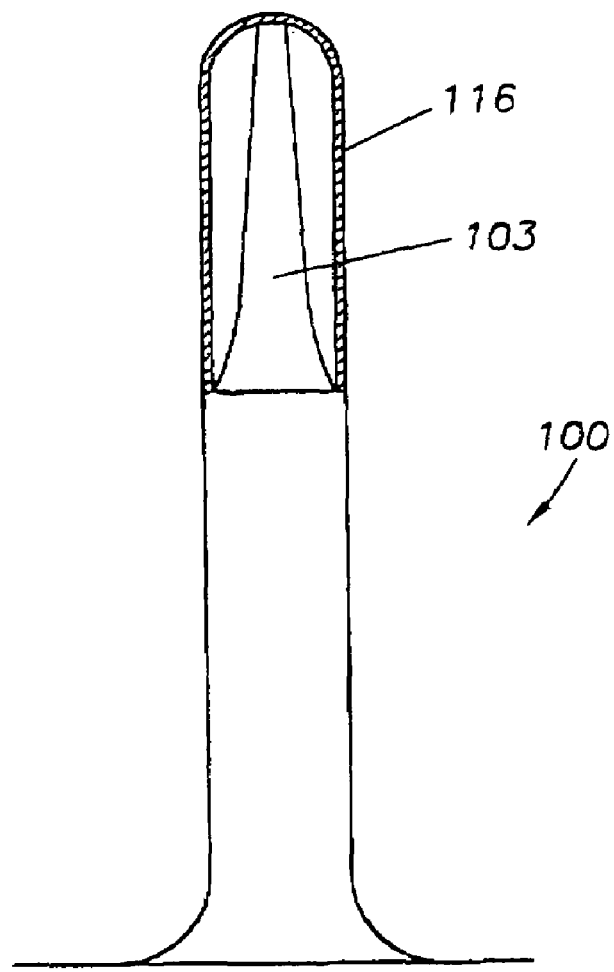
FIG. 16A shows the bristle of FIG. 15A with coated sections.
Figure 16B:
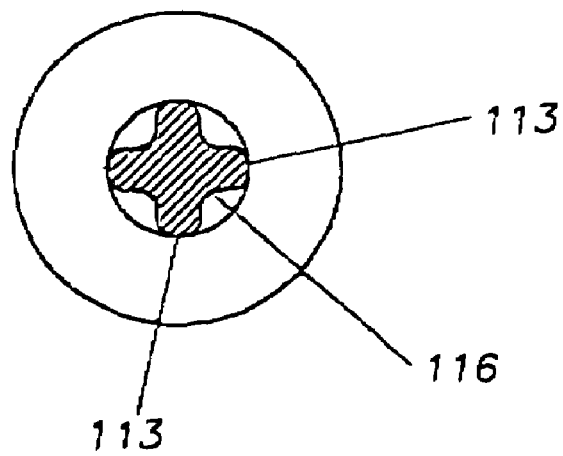
FIG. 16B shows a top view of the bristle of FIG. 16A.

While in the embodiments described up to now, the bristle has a conicity which tapers towards its free end at least along partial regions of its length, FIGS. 15A and 15B show a bristle 100 comprising a cylindrical enveloping surface. A profiling 101 corresponding to the bristle of FIG. 2A is formed in the region of the tip section and at least in the upper region of the active and flexing section. In accordance with a further development as shown in FIGS. 16A and 16B, the profiling 101 has an external coating 116 which completely surrounds the outer surface of the bristle 100 in the region of the profiling 101.

Figure 17A:
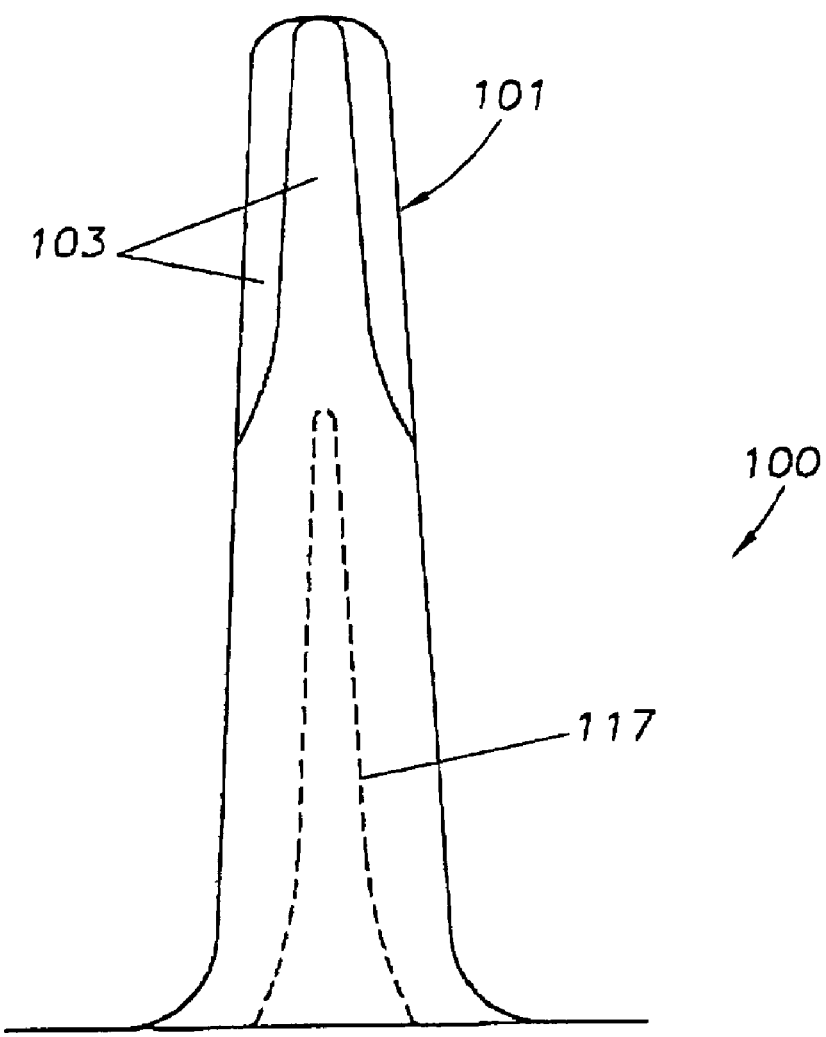
FIG. 17A shows a side view of a bristle with inner hollow axial channel.
Figure 17B:
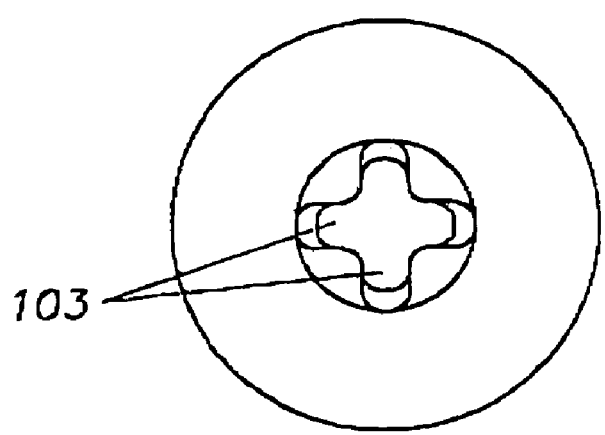
FIG. 17B shows a top view of the bristle of FIG. 17A.

FIGS. 17A and 17B show a further development of the bristle of FIG. 2A and differ therefrom only in that the bristle 100 has a hollow axial channel 117 travelling in the longitudinal direction which starts at the lower end of the root region and extends approximately to half the height of the bristle. The hollow axial channel 117 may be filled with active substances, e.g. sodium fluoride, xylite or other organic or inorganic materials and can gradually release them to the surface of the bristle during use. While the cavity only extends to the lower end of the structure 101 in FIG. 17A, FIGS. 18A and 18B show a bristle 100 with cylindrical enveloping surface which has a hollow axial channel 117 which extends approximately through the entire length of the bristle to shortly below the free end. The front end of the hollow channel in the vicinity of the free end of the bristle has a thin sealing membrane 117*a* made from the bristle material itself and through which the active substance located in the hollow channel 117 can be released.

FIGS. 19A and 19B show a further development of the bristle of FIG. 18A, wherein the hollow channel 117 extends through the entire bristle and opens in the tip section at its free end.

Figure 20A:
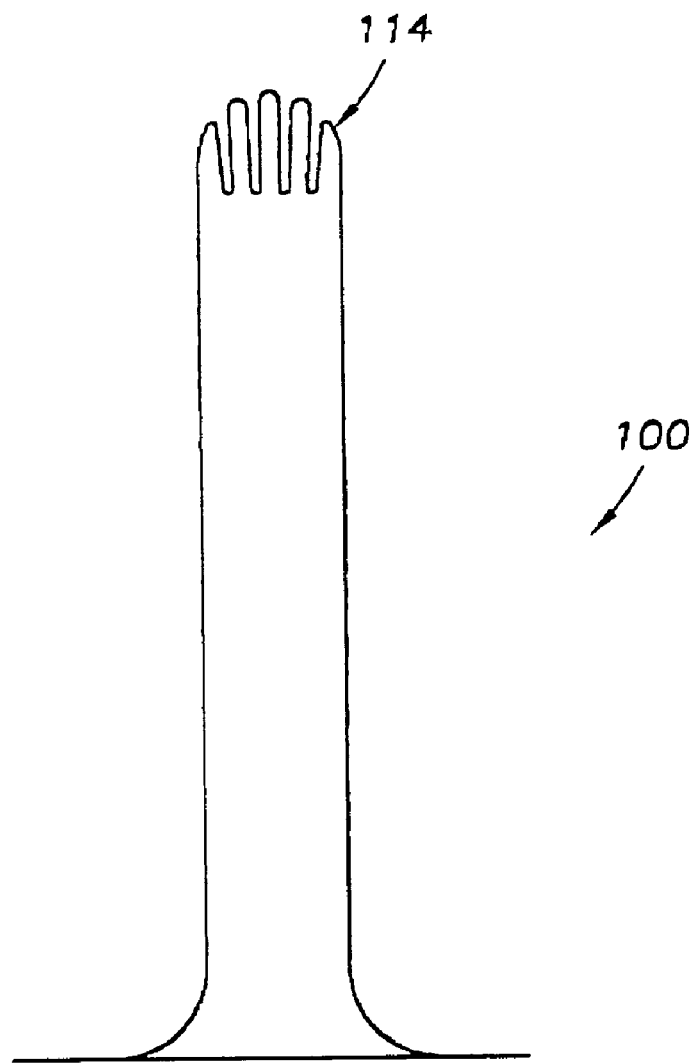
FIG. 20A shows a bristle with axial fingers in the tip section.
Figure 20B:
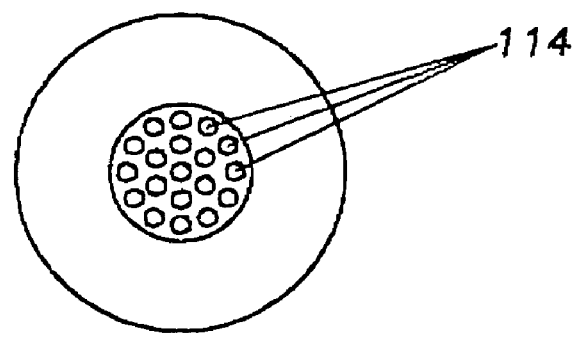
FIG. 20B shows a top view of the bristle of FIG. 20A.

The bristle 100 shown in FIGS. 20A and 20B is uniformly cylindrical with the exception of its tip section. The tip section is formed by a plurality of integral fingers 114 extending axially and upwardly. Instead of the plurality of parallel integral fingers 114, the tip section may be formed by a profiled element 118 having one or more components (shown in FIGS. 21A through 21M). In the design of FIGS. 21A and 21B, the profiled element 118 is formed by a vertical, substantially rectangular wall with rounded ends. Alternatively, in accordance with FIG. 21C, two mutually crossing walls which are correspondingly disposed perpendicular to each other are provided thereby forming a crossed section. FIG. 21D shows the profiled element as three axially freely protruding integral pins which are mounted at their lower ends and which have circular cross-sections. FIG. 21E shows a profiled element in the form of three mutually crossing walls arranged to form a star-shaped cross-section.

Instead of providing a substantially rectilinear wall in accordance with FIG. 21A, FIG. 21F shows a curved, thin wall with a meandering or double-S-shaped cross-section. The active and flexing section disposed below the profiled element 118 does not have the previously described circular cross-section, rather an oval cross-section. FIG. 21G shows a design corresponding to FIG. 21F with the difference being that the active and flexing section bearing the profiled element 118 now has a rectangular cross-section with rounded edges.

In accordance with FIG. 21H, the profiled element has a triangular cross-section with three sharp outer edges. The profiled element in accordance with FIG. 21I is created in a solid cross-section in which two axial slots, disposed perpendicularly with respect to each other, are formed to generate four independent vertical pins, each having a circular segment cross-section.

In accordance with FIG. 21J, the tip section has four walls distributed about the periphery and formed with a radially outwardly concave shape which have effective edges in each of their end regions.

FIG. 21K shows a profiled element 118 with a star-shaped cross-section i.e. an inner core which has axial grooves on its outside with intermediate outwardly facing sharp edges.

FIG. 21L shows an active and flexing section with oval cross-section on which three short curved walls are disposed whose convex surfaces are directed radially outwardly. Two of the walls are disposed next to one another and the third wall is laterally offset thereto. FIG. 21M shows a modification of this embodiment, wherein the active and flexing section has a rectangular cross-section with rounded edges and the walls forming the profiled elements 118 have an L-shape and are radially outwardly angled.

Figure 22A:
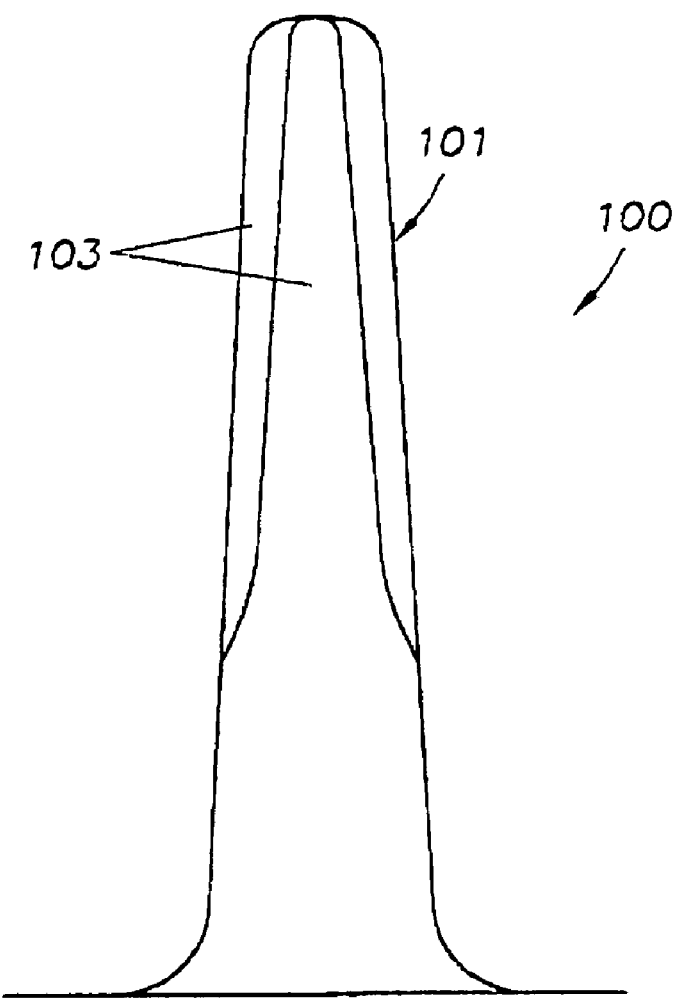
FIG. 22A shows a view of a further embodiment of the bristle.
Figure 22B:
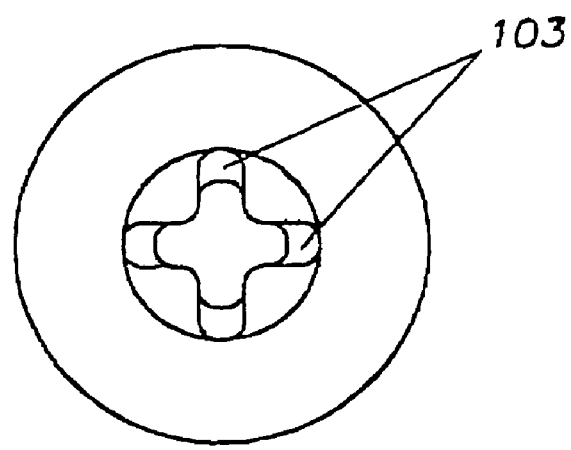
FIG. 22B shows a view of the bristle of FIG. 22A.

FIGS. 22A and 22B show a modification of the bristle in accordance with FIG. 2A which differs therefrom in that the profiling 101 is formed not only in the tip region and in the active and flexing section but also in the upper region of the shaft section. The shaft base section and the bordering lower region of the shaft section are also provided with a continuous, smooth, and depression-free jacket.

Figure 23A:
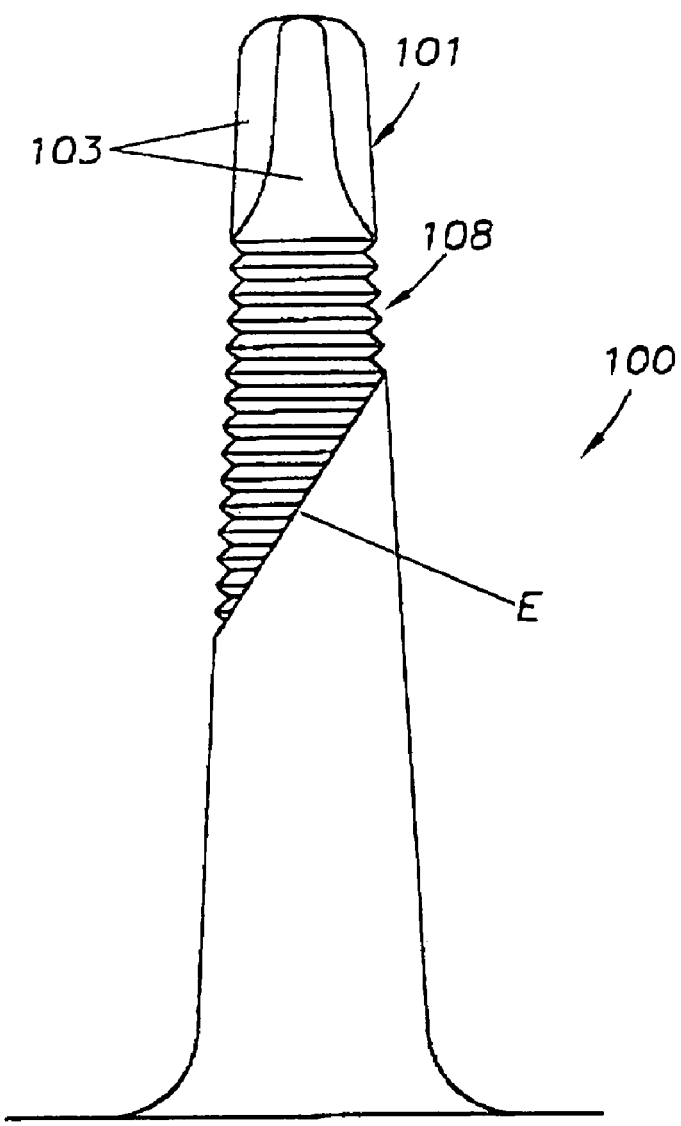
FIG. 23A shows a view of a further embodiment of the bristle.
Figure 23B:
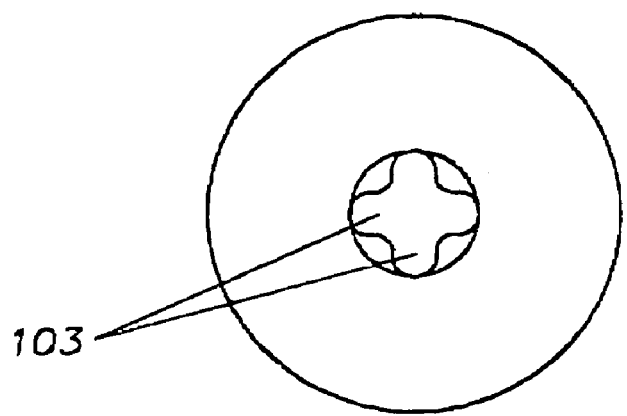
FIG. 23B shows a top view of the bristle of FIG. 23A.

In the embodiments mentioned above, the transition between the unprofiled jacket and the profiling was always in a plane extending substantially perpendicular to the longitudinal axis of the bristle as a result of which the bristle has similar usage properties independent of its peripheral orientation. FIGS. 23A and 23B show a bristle with which the transition between the lower unprofiled jacket and the upper profiling 108 formed by a plurality of horizontal circulating grooves above which a further profiling 101 with crossed cross-section and axial ribs 103 is disposed, is in a plane E extending at an angle with respect to the longitudinal axis of the bristle. In the embodiment shown, the plane E has an inclination of approximately 45°. The bristle therefore has a profiling along a larger part of its length at the left-hand side of FIG. 23A than on the right-hand side of FIG. 23A and the brushing and cleaning properties of the bristle consequently depend on the orientation with which they are fixed to the bristle support.

Figure 24A:
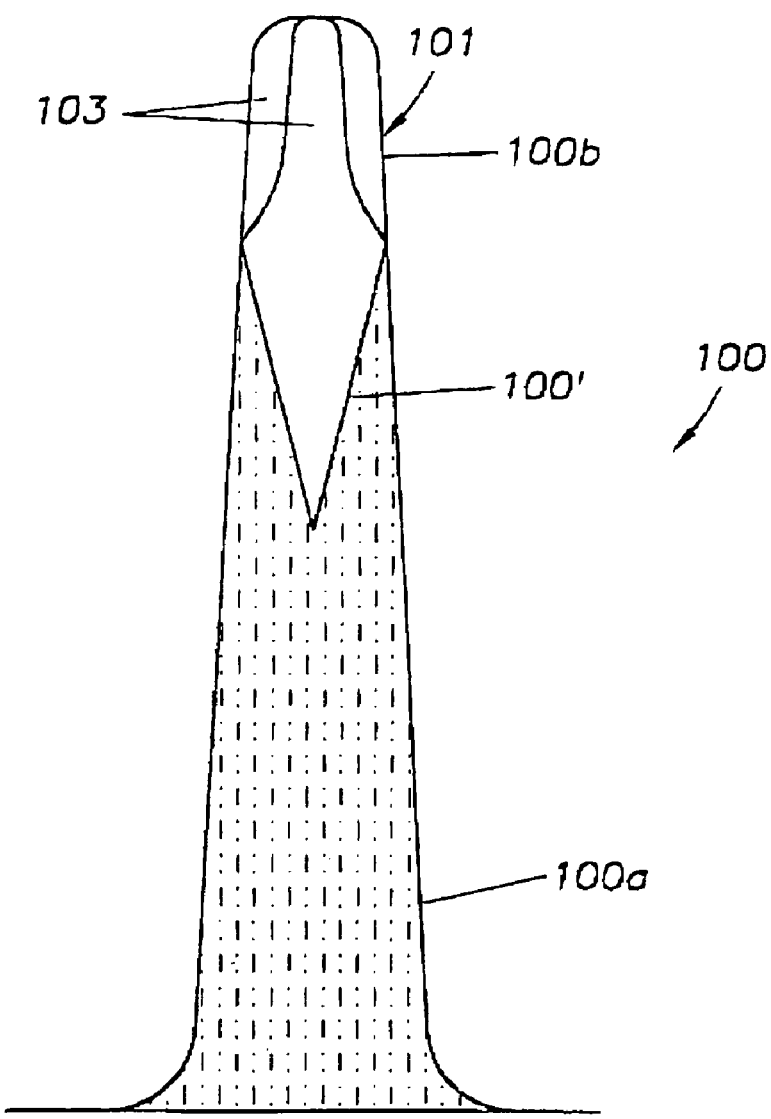
FIG. 24A shows a view of a further embodiment of the bristle.
Figure 24B:
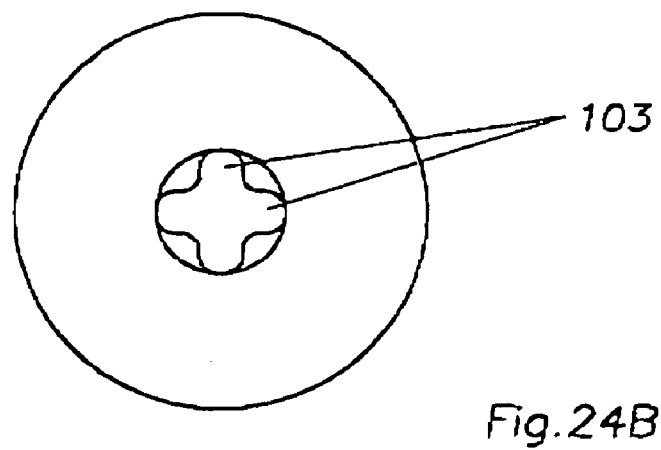
FIG. 24B shows a top view of the bristle of FIG. 24A.

FIGS. 24A and 24B show a modification of the bristle in accordance with FIG. 13. The bristle 100 also consists of several parts 100a and 100b made from different materials. The surface of the lower part 100a may be roughened. The connection between the two parts 100a and 100b is obtained through a funnel-shaped contacting surface 100', which permits appropriate connection between the parts 100a and 100b even for relatively small bristle sizes. The profiling 101 is formed in the tip section of the bristle 100 by a crossed cross-section with four axially extending ribs 103.

Figure 25A:
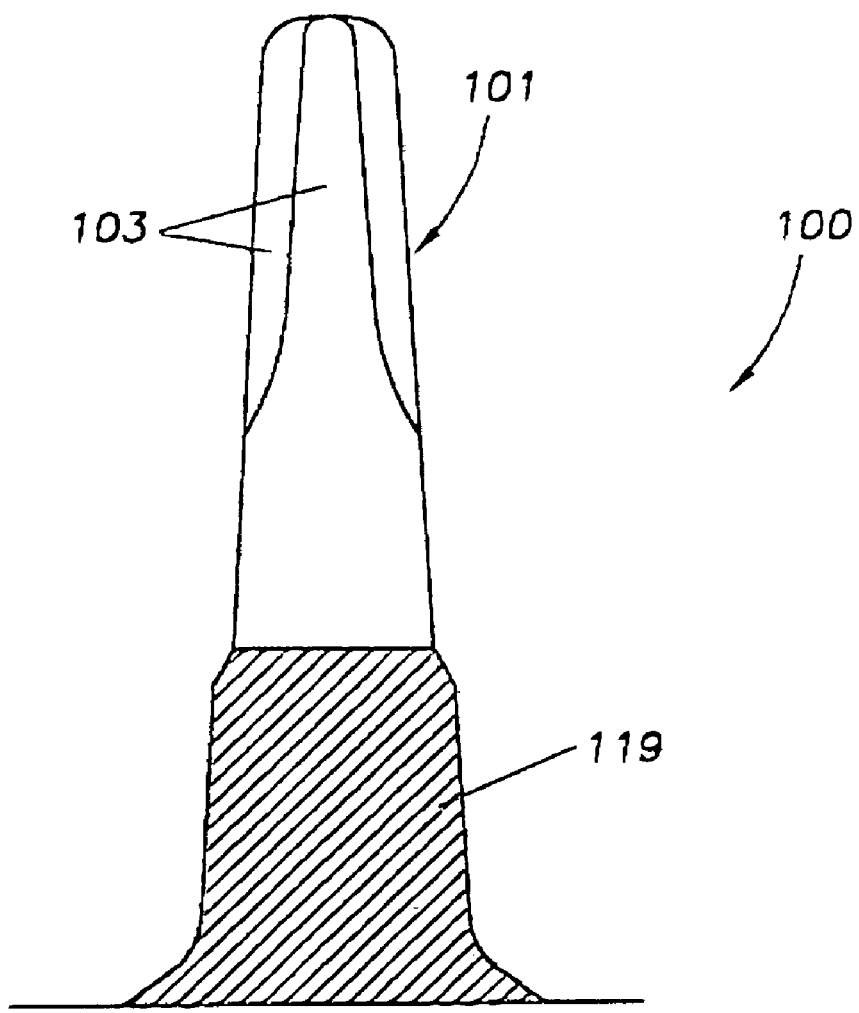
FIG. 25A shows a view of a further embodiment of the bristle.
Figure 25B:
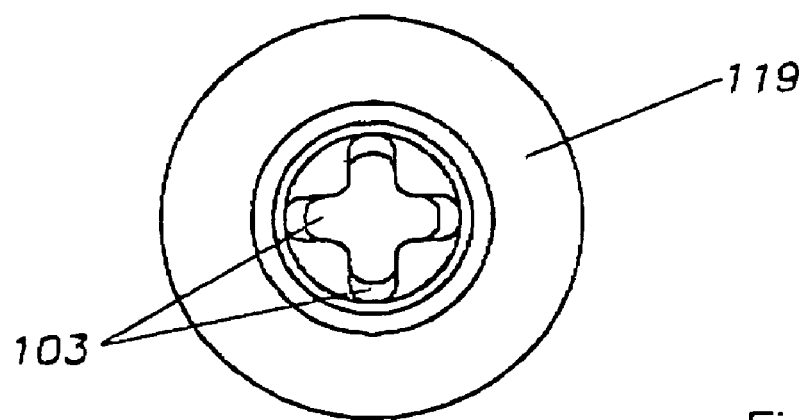
FIG. 25B shows a top view of the bristle of FIG. 25A.

FIGS. 25A and 25B show a bristle corresponding to FIG. 2A having an additional external cover 119 in the lower region of the shaft section, shaft base section and root region which can reinforce and stabilize the bristle and/or provide visual indication of certain bristle properties.

Figure 26:
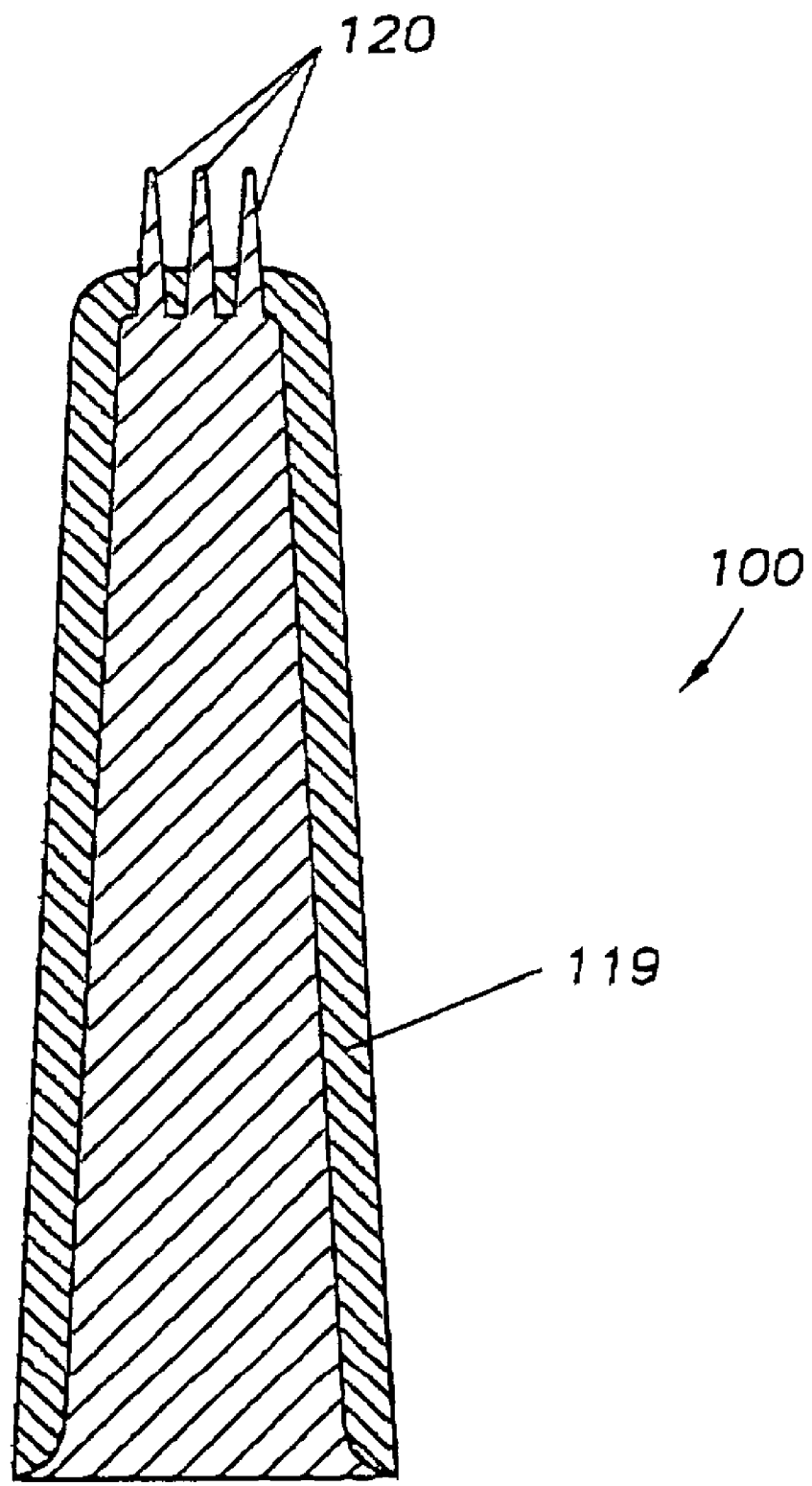
FIG. 26 shows a longitudinal section through a bristle according to an alternative embodiment.

In accordance with FIG. 26, the entire bristle is provided with a cover 119 wherein the tip section has several axially upwardly protruding fingers 120 which penetrate through the cover 119.

A possible production method of a corresponding inventive bristle is explained in detail below wherein the illustrations show a bristle without surface profile for reasons of simplification.

Figure 27A:
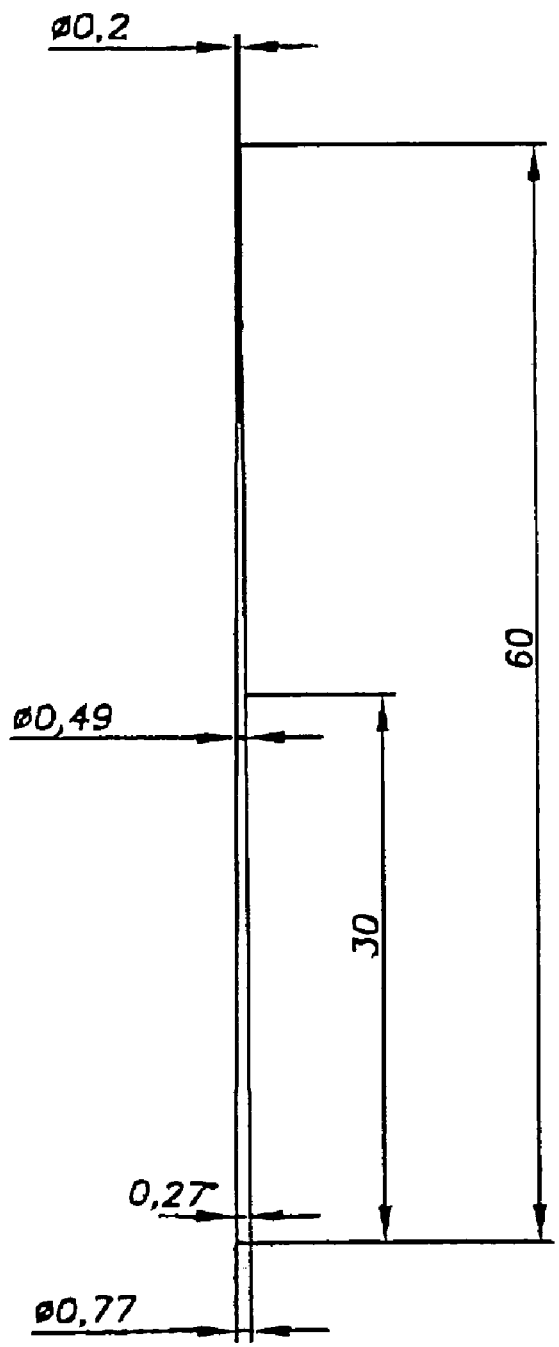
FIG. 27A shows a schematic view of a conical bristle on a scale 2:1 with dimensioning.
Figure 27B:
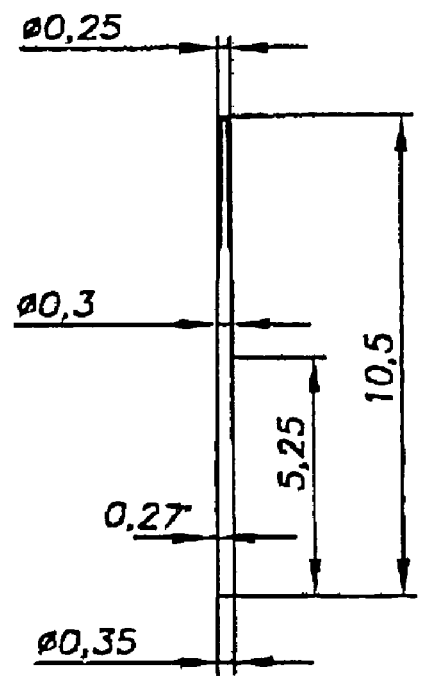
FIG. 27B shows a schematic view of a conical bristle on a scale 5:1 with dimensioning.

The above mentioned operating parameters for injection pressure and the achievable high core speeds with large shearing effect through wall friction produce thin bristles of adjustable length using injection molding, which has not been possible up to now, not even with extrusion of endless monofilaments, wherein even weak conicity of bristles of such endless monofilaments can be realized only through considerable technical effort (interval withdrawal). FIGS. 27A and 27B show two embodiments. FIG. 27A shows (scale 2:1) a bristle having a diameter of 0.77 mm in the root region and of 0.2 mm at the bristle end, and with an average diameter of 0.49 mm at half-length. With an extremely weak conicity angle of 0.27°, which corresponds to the mold slope of the bristle-molding channel, bristles of a length of 60 mm or more can be injection-molded as are required e.g. for high-quality paint brushes or the like. They have an average diameter at half bristle length of approximately 0.5 mm. FIG. 27B shows (scale 5:1) a bristle of a diameter of 0.35 mm in the root region and of 0.25 mm at the bristle end with a bristle length of 10.5 mm and the same conical angle (mold slope). The average diameter is 0.3 mm. Bristles of this type are suited e.g. for toothbrushes. Due to the slender geometry of such bristles, they can be densely arranged without producing excessive separation in the region of the bristle ends—in contrast to conventional injection-molded bristles.

Figure 28:
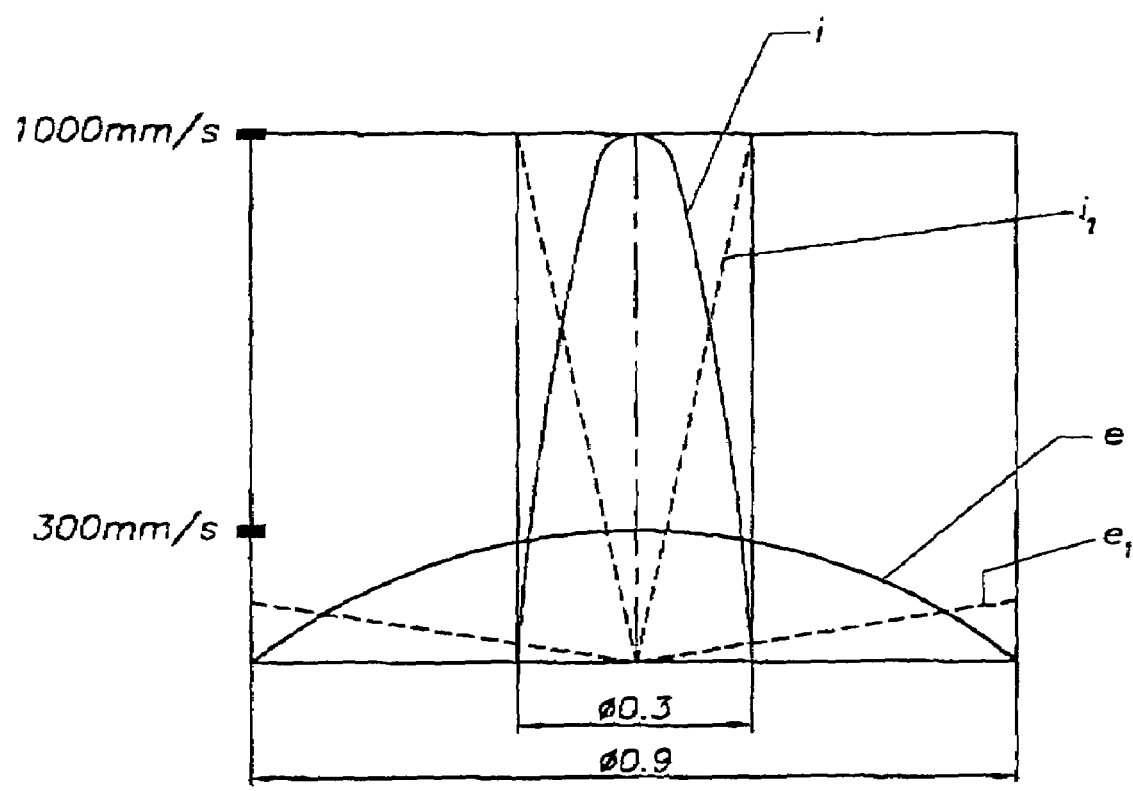
FIG. 28 shows a comparative schematic view of the speed profiles in an extrusion nozzle and in a mold channel.

FIG. 28 shows the superiority in terms of technical properties and applications, of the bristle produced according to the invention compared to a bristle produced by extrusion.

During extrusion spinning of a monofilament for producing a bristle of an average diameter of 0.3 mm, the spinning nozzle has an outlet diameter of 0.9 mm (outer vertical lines in FIG. 28). The molten polymer mass has a maximum flow speed (core speed) inside the nozzle of typically approximately 300 mm/s, which is determined by the extrusion pressure and the withdrawal speed of the monofilament. The monofilament, which leaves the nozzle, is drawn along a short path, by means of the withdrawal forces, to a diameter of between 0.9 and 0.3 mm and cooled directly thereafter to fix the molecular structure. During subsequent drawing, the monofilament is given its final diameter of 0.3 mm with a diameter tolerance of approximately ±10%. The speed profile is designated as e (extrusion) in FIG. 28.

In the inventive injection molding, the bristle-molding channel has an average diameter of 0.3 mm (the two inner vertical boundary lines in FIG. 28). An injection pressure in the region of 2000 bar ($2 \cdot 10^5$ kPa) produces a core speed of approximately 1000 mm/s in the channel. The speed profile is designated as i (injection). The shearing effect in the flow, in particular in the region close to the wall is relevant for the intrinsic strength of the thermoplastic polymer, which is determined by the shearing rate (shearing moment) γ. The shearing rate γ across the radius r of the flow channel depends on the derivative of the speed profile with respect to the radius r $$\gamma(r) = |dv(r)/dr| = \frac{2v_{max}}{R^2} \circ r$$

which is inversely proportional to the square of the effective diameter of the flow channel. The shearing rate is linearly proportional to the maximum flow speed (core speed). In the above-described example shearing rates for the injected bristle are produced which exceed the stated extrusion flow by at least a factor of 10.

The broken lines in FIG. 28 illustrate the shearing rates without scaling for extrusion ($e_1$) and for injection molding ($i_1$). They have respective maxima at the walls of the nozzle of the bristle-molding channel.

FIGS. 29 to 32 schematically show an embodiment of an injection mold in different operational phases which is particularly suited for injection molding of the bristles according to the inventive method. The scale is highly enlarged to show the details more clearly.

The injection mold 1 has several long parallel molding channels 2 which are joined to an injection molding means via a supply channel 3. The injection molding means is designed to produce injection pressures in the region of 500 bar ($0.5 \cdot 10^5$ kPa), preferably $\geq$2000 bar ($2 \cdot 10^5$ kPa). The exact magnitude of the injection pressure is set in dependence on the cross-sectional shape of the molding channel 2 along its length and in dependence on the length itself such that a specific pressure >300 bar ($0.3 \cdot 10^5$ kPa) occurs in the molding channel.

The injection mold consists of a plurality of layered molding plates 4 of substantially identical thicknesses, of a molding plate 5 on the injection side, and a molding plate 6 forming the bristle ends. Each molding plate 4, 5 and 6 generates one longitudinal section of the molding channel 2, which is preferably produced by bore holes.

The molding plate 5 has openings 7 on the injection side which narrow towards the molding channel 2 to produce e.g. the extension flow and form the root region a of the bristle. The subsequent longitudinal sections of the molding channel in the molding plates 4 have a cylindrical or slightly conical cross-sectional shape along their length while the molding plate 6 forming the bristle ends has blind holes 8 which are dome-shaped in the embodiment shown.

During injection molding, the molten polymer mass enters into the narrowing openings 7 of the molding plate 5 via the supply channel 3 and, due to the high core speed, fills the entire molding channel up to the plate 6 forming the ends. The molten polymer mass has a substantially unordered, balled molecular structure in the supply channel 3 which is transformed into a longitudinal molecular structure in the opening 7 on the injection side and subsequent molding channel 2 due to the strong shear flow.

The molding plates 4, 5 and 6 can be moved perpendicular to the plane of the plate to release the injection-molded bristles when they have achieved sufficient shape stability. The injection molding tool 1 is preferably cooled such that the wall of the molding channels 2 remains relatively cold, thereby supporting the formation of crystals in the molten polymer mass.

Figure 32:
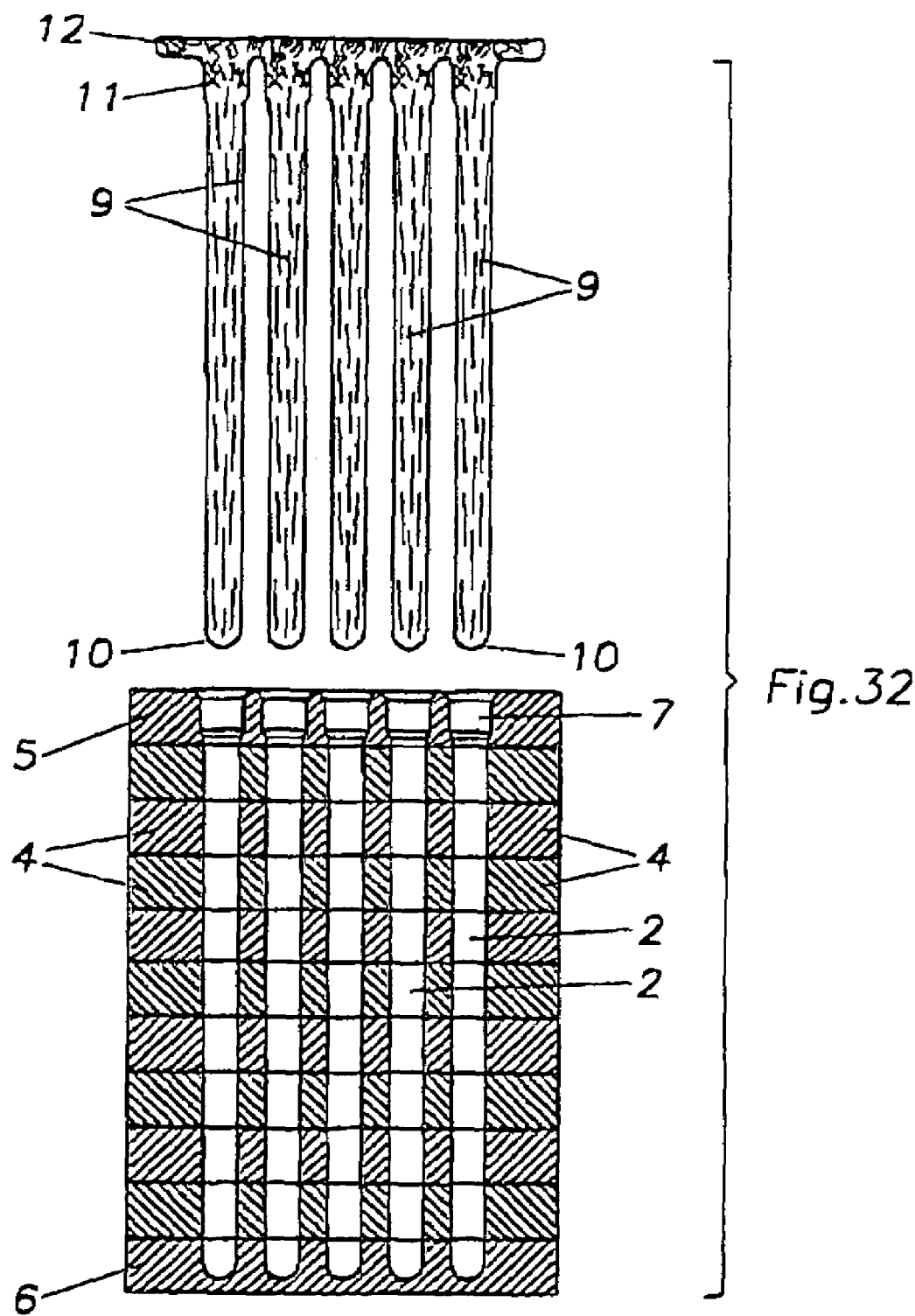
FIG. 32 shows a schematic longitudinal section through an embodiment of an injection mold in a fourth operational phases.

To release the bristles from the mold, the molding plate 6 is initially removed (FIG. 30). Only very small adhesive forces must be overcome thereby ensuring that the bristle ends, which are particularly important for later use of a brush or a paintbrush, maintain their shapes. The molding plates 4 are subsequently removed individually or in groups (FIG. 31) until the ends 10 of the bristles 9 are released along most of their length. During these releasing steps, the bristles are retained by means of the molding plate 5 on the injection side and this molding plate 5 is also subsequently removed to expose all bristles 9 with their slightly thickened root region 11 (FIG. 32). The molten polymer mass in the supply channel on the injection side also effects a connection 12 among all bristles 9 and the overall blank can be removed and finished into a brush, a paint brush or the like, wherein the connection is either integrated into the structure or only serves as auxiliary means for handling the bristles and is separated off before connecting the bristles to a brush body or the like.

Figure 33:
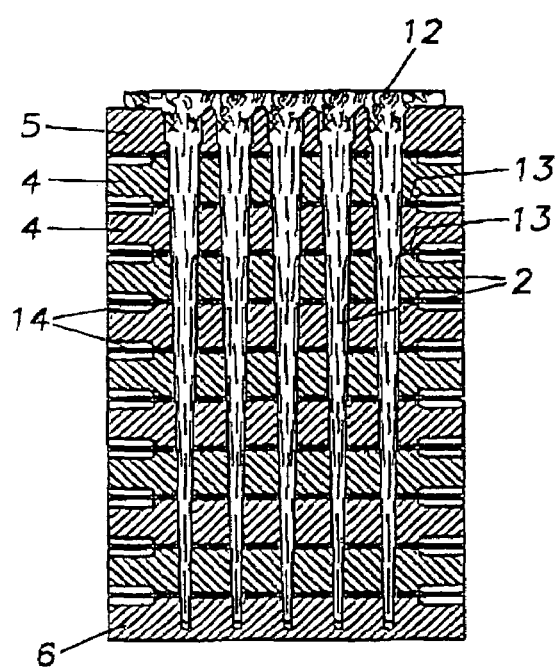
FIG. 33 shows a schematic longitudinal section through a further embodiment with reference to the injection mold.

Optimum venting of the molding channels must be provided during injection molding to facilitate the desired high core speed. FIG. 33 shows an embodiment thereof. Venting occurs via narrow gaps 13 between the molding plates 4, 5 and 6 so that the air is removed along the entire length of the molding channels 2 as the front advances. Instead of narrow gaps 13, it is also possible to roughen the mutually facing surfaces of the molding plates 4, 5 and 6, to obtain overall venting cross-sections of sufficient size. The venting cross-sections have widenings 14 towards the outside to permit rapid escape of the exhausting air.

Figure 34:
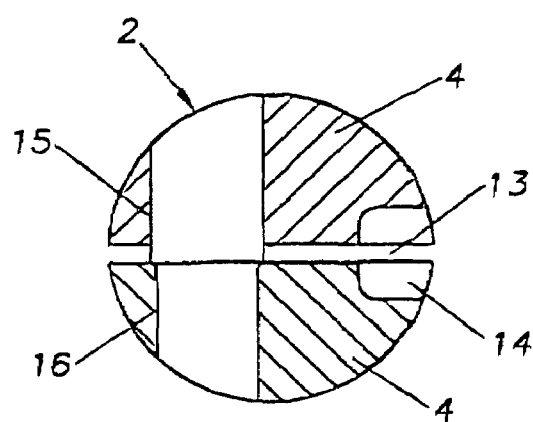
FIG. 34 shows an enlarged detail of the injection mold according to FIG. 33 in the region of an external mold channel.

The molding channels 2 may taper along their entire length with a mold slope <1.0°, wherein the tapering is not dictated by release from the mold but rather by the desired bristle shape and its bending behavior. The cross-sectional shape of the molding channels 2 must not be continuously conical (see the enlarged scale of FIG. 34 illustrating the venting geometry). The upper molding plate 4 in the drawing indicates a cylindrical longitudinal section 15 and the lower molding plate 4 a cylindrical longitudinal section 16 for the molding channel 2. The cross-section of the two molding plates 4 tapers from the longitudinal section 15 to the longitudinal section 16 of the molding channel 2 by a few μm to produce a weak step at this point. At this step region, venting takes place via the gap 13 between the two molding plates, which map into a widening 14. During release from the mold, these unnoticeable steps are not visible and produce slight conicity along the entire length of the bristle. The longitudinal sections 15, 16 in the individual molding plates 4 can be produced through simple drilling. Alternatively, the longitudinal sections of the individual molding plates can have identical diameters to produce a cylindrical bristle. More distinct diameter changes produce stepped bristles.

Conical bristles are technically advantageous for injection molding and for removal from the mold. The smallest cross-section at the bristle end cools more rapidly than the subsequent regions of the bristle towards the root region and the step-by-step release from the bristle end to the bristle root follows the temperature gradient in the bristle.

The molding plates 4 have a thickness of a few millimeters. It may correspond approximately to three to fifteen times the diameter of the molding channel 2 so that extremely precise drilling of the longitudinal sections in the individual molding plates is possible. Since they are kept adjacent to one another under the closing pressure of the injection-molding machine, even these thin molding plates maintain their dimensions and shape, despite the high injection pressure. The low thickness also ensures good thermal dissipation, since the molding plates are evenly insulated by the venting gaps. They are easy to cool for the same reason, e.g. using external coolants, which can be particularly effective when the mold is closed, and also during the time between opening and renewed closing. Effective cooling already occurs via the surrounding air due to exposure of the molding plates and in consequence of their small thickness. Alternatively, the cooling means may be integrated in or between the molding plates. Finally, the minimal loading under injection pressure permits production of the molding plates from materials having good thermal conductivity with less stringent mechanical strength properties than steel or the like.

The influence of effective cooling on the molecular structure of the bristles has already been discussed above.

FIG. 35 also schematically shows an injection mold 1 which consists of layered molding plates 4, wherein the molding plate on the injection side does not have widened cross-sections. In contrast to the above-described embodiments, the molding plates 4 are divided into two groups 17, 18 (see FIG. 36) wherein each group comprises at least one molding plate which can be transversely displaced (indicated in FIGS. 36 to 39 with double arrows 19, 20.)

The transversely displaceable molding plates cooperate with the neighboring molding plates to clamp the blanks 21, which, in this embodiment, only form one portion (longitudinal section) of the final bristle. The blank 21 is injected from a thermoplastic polymer with injection parameters matched to this longitudinal section of the finished bristle. After the injection cycle, at least one displaceable plate of the group 18 of molding plates 4 (FIG. 36) is brought into a clamping position and the blanks 21 are carried along when the group 18 is removed to be thereby partially released from the molding plates 4 of the group 17 on the injection side and free a predetermined longitudinal section 22 of the molding channels in the molding plates 4 of the group 17. At the end of the blank 21, profilings may be optionally formed as indicated in the drawing. After withdrawal of the molding plates 4 of the group 18, the displaceable molding plate in the group 17 is brought into the clamping position and the exposed longitudinal sections 22 are subsequently filled with a molten polymer mass, which consists of another polymer or a polymer with other additives. The longitudinal sections 23 of the bristle which are formed thereby connect to the blanks 21 through material bonding and/or positive locking. Subsequently, the displaceable forming plate in group 17 is returned to its initial position and the blanks 21 with molded-on longitudinal sections 23 are again partially withdrawn from the molding channels of the group 17 when the clamping means is closed to expose longitudinal sections 24 in the molding channels. In a further injection molding cycle, the longitudinal sections 24 are filled with a further molten polymer mass with optionally further differentiated properties to finally obtain bristles 27 having three regions (sections 21, 23 and 25) for different mechanical strength properties and/or different usage properties along the bristle length. In particular, the region 21, which encloses the bristle end, can serve as wear display to show the degree of wear of the bristle. Final release of the bristles from the mold is carried out as described above.

FIGS. 40 to 43 also show an injection mold 1 (FIG. 40) which consists of two groups 17, 18 of molding plates 4 each of which has at least one transversely displaceable molding plate to form a clamping means. In contrast to the above-described embodiment, the molding plate 5 on the injection side has widenings, which taper towards the molding channel. The molding plate 6 forming the bristle ends has blind holes 28, 29 and 30 of different depths with dome-shaped hole bottoms such that a plurality of bristles of different lengths can be produced whose ends lie on a curved envelope surface.

Figure 40:
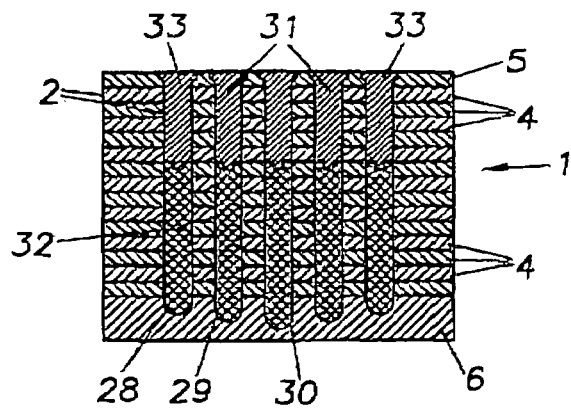
FIG. 40 shows a schematic longitudinal section through a further embodiment of the injection mold in a first operational phases.
Figure 41:
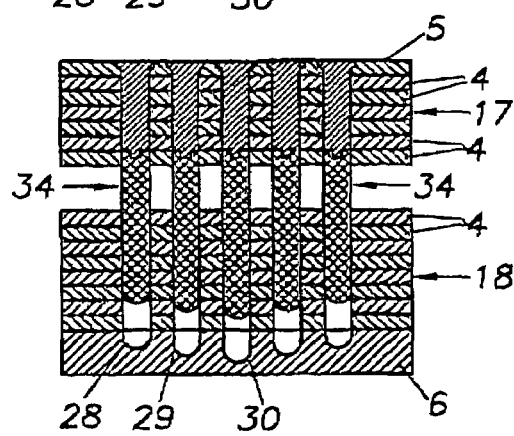
FIG. 41 shows a schematic longitudinal section through a further embodiment of the injection mold in a second operational phases.

In the embodiment of FIGS. 40 to 43, bristles are injected sequentially with two different regions 31, 32 wherein the region 31 has an extended bristle root 33. The multiple-section bristles 34 (FIG. 41) injected in this fashion are subsequently removed from the mold at their ends by removing the molding plate 6 forming the bristle ends and—optionally with delay—removing the molding plates 4 of the group 18 (FIG. 41). Subsequently, at least one transversely displaceable molding plate in the group 18 is brought into a clamping position and the entire group 18, optionally together with the terminal molding plate 6, is displaced in the opposite direction so that the part of the region 31 of the bristles 34 including the root region 33 project past the molding plate 5 at the injection side. Subsequently, the injection mold 1 (FIG. 42) is connected to a further injection mold 35 with a mold cavity 36 into which a molten polymer mass is injected with which the root regions 23 and the longitudinal sections of the regions 31 which project into the cavity 36 are injected. The mold cavity 36 may be formed so that it defines an intermediate support for the bristles or a complete brush body in which the bristle ends are embedded without gaps so that they cannot be pulled out.

Figure 42:
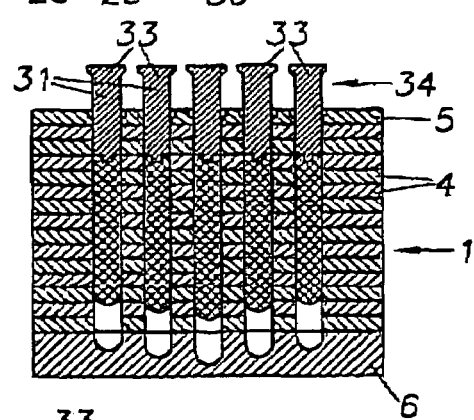
FIG. 42 shows a schematic longitudinal section through a further embodiment of the injection mold in a third operational phases.
Figure 43:
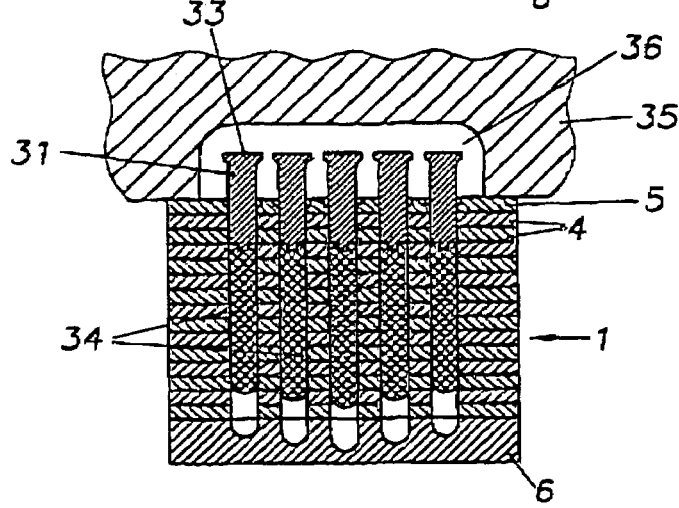
FIG. 43 shows a longitudinal section through the injection mold corresponding to FIGS. 40 through 42 with a supplementary mold.

In a modification of this embodiment, the molding channels 2 of the injection mold 1 of FIG. 40 can also be completely filled with one single molten polymer mass and, as shown in FIGS. 41 and 42, their root regions can be exposed together with the adjacent longitudinal sections for injection with the support-forming molten polymer mass (FIG. 43).

In a further modification, the bristles which are injected according to FIGS. 40 to 42 and released at their mounting-side ends can be completely released from the mold through removing the molding plate 6 forming the ends and the major part of the subsequent molding plates 4 while being held by a few, at least three, molding plates, e.g. the injection-side molding plate 5 and the two subsequent molding plates one of which can be transversely displaced to form a clamping means. These molding plates, which serve as a transport holder, can be transported together with the bristles into another injection molding station in which they are brought into connection with the injection mold 35 while simultaneously providing a new set of molding plates with injection-side molding plate 5 to complete the injection mold 1. This transport holder can move the bristles into the second injection molding station and also continue transport into other processing stations.

FIGS. 44 and 45 show part of an injection mold 1 with molding plates 4 and 5 after production of the bristles and removal of at least the last molding plate 6 (not shown). Replacing the latter, a flat thrust plate 39 is moved in front of the released ends with which the bristles 38 are displaced in the molding channels of the remaining molding plates until their root region 37, and optionally an adjoining longitudinal section, project past the injection-side molding plate 5 or into the mold cavity 36 of the further injection mold 35 and are injected with a molten polymer mass to form a bristle support or a brush body.

FIGS. 46 and 47 show an embodiment with which, after production of the bristles 38 as described with reference to FIGS. 44 and 45, instead of the flat thrust plate 39, a thrust plate 40, which has cam-like projections 41 and 42 of different heights, is moved in front of the released bristle ends. When the thrust plate 40 has been moved towards the molding plates 4, the bristles are displaced along the thrust path to different depths within the molding channels so that their root region 37 projects into the mold cavity 36 of the injection mold 35 to different depths and the bristle ends lie on a curved envelope surface after injection and removal of the thrust plate 40 and molding plates 4 and 5.

FIGS. 48 and 49 show an embodiment which differs from that of FIGS. 44 and 45 only in that the bristles 38 are interconnected in the region of the injection-side molding plate 5 via a connection 43 in the form of bars, grids or the like and project with the connection 43 and the subsequent longitudinal sections of the bristles 38 into the cavity 36 of the injection mold 35 after displacement via the thrust plate 39.

A smaller group of molding plates 4, preferably including the injection-side molding plate 5 and with at least one molding plate 4 which can be transversely displaced to act as clamping means, may serve as transport holder for transferring the bristles into further injection molding stations, processing stations or the like.

Figures 50, 51:
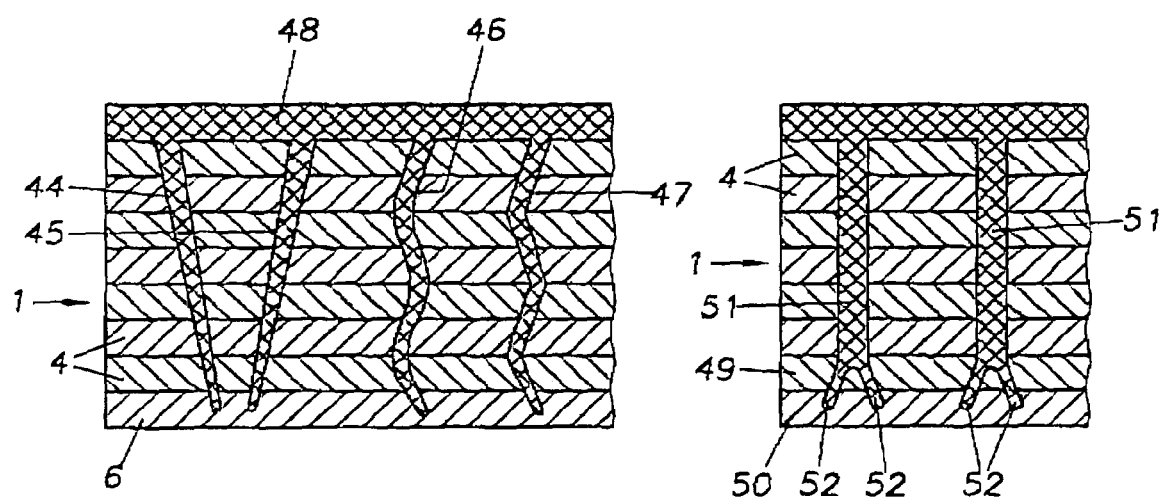
FIG. 50 shows a schematic longitudinal section through an injection mold for producing bristles of different lengths.
FIG. 51 shows a schematic section through an injection mold for producing bristles with split bristle ends.

The layered structure of the injection mold from a plurality of molding plates and the thereby possible sectional removal from the mold and the increase in the modulus of elasticity and tensile strength obtained by the inventive method parameters of injection pressure and flow speed in the molding channel permit production of bristles whose central axis is not in the direction of release from the mold. FIGS. 50 and 51 show examples thereof. FIG. 50 shows a part of an injection mold with slanting molding channels 44, 45 that are inclined towards each other in this embodiment. In addition to or alternatively, the injection mold 1 may have wavy, curved molding channels 46 or molding channels 47 with several bends so that correspondingly formed bristles are produced which can be injected in a composite action via a connection 48. For release from the mold, the molding plates 4 and 6 are removed, starting with molding plate 6, and the bristles are released in sections without being deformed due to their high bending elasticity and the small release length.

The bristles may be fabricated into a brush after separation of the connection, individually or in groups or together with the connection 48 through injection around it or through other conventional thermal or mechanical connection methods.

In the embodiment of FIG. 51, the injection mold 1 has layered molding plates 4 and two end molding plates 49, 50 that form distinctively branched bristle ends. The injection-molded bristles 51 each have finger-like bristle ends 52 which can be easily removed from the mold due to the thin molding plates and the increased stability of the bristles.

The molding plates 6 or 49, 50 which form the bristle ends can be made from a sintered metal, in particular, for distinctly branched bristle ends which also provides additional venting in this region to effectively prevent trapping of air. The molding plates 4 can, of course, also be made from such sintered metals to support venting of the molding channels. Microroughness which exists e.g. in sintered metals or which can be produced through surface treatment of the molding channel produce corresponding roughness in the micro region on the surface of the finished bristle which have a moisture repellant "Lotus" effect during use of the bristle.

I claim:

1. A bristle for mounting in or to a bristle support, in particular for a cleaning brush, a toothbrush, or an application brush, the bristle comprising:
   a lower root region, said root region for mounting in or to the bristle support or for forming a part of the bristle support;
   a lower shaft base section bordering said root region;
   a shaft section disposed adjacent to and above said lower shaft base section, said lower shaft base section and said shaft section forming a shaft region;
   a lower active flexing section bordering above said shaft region;
   a tip section disposed above and adjacent to said lower active flexing section and defining a free end of the bristle,
   said lower active flexing section and said tip section constituting a flexing region, said flexing region and said shaft region constituting a free length of the bristle lying outside of the bristle support and being disposed above said root region,
   wherein the bristle has a continuous, depression free jacket in said shaft base section and in said shaft section, and
   at least portions of a jacket in said flexing region have a profiling defining elevations and/or depressions disposed within a peripheral surface of the bristle;
   wherein said profiling comprises at least one groove which extends about the bristle, and
   wherein said shaft region comprises 15% to 85% of said free length of the bristle; and
   wherein at least one section of said free length of an outer surface of the bristle have a conical or a truncated conical envelope.

2. The bristle of claim 1, wherein said profiling is formed in an upper region of said active flexing section and/or in said tip section.

3. The bristle of claim 1, wherein only said tip section is provided with said profiling.

4. The bristle of claim 1, wherein a cross-section of the bristle in said shaft base section and/or in said shaft section and/or in said active flexing section is circular, oval or polygonal with rounded corners.

5. The bristle of claim 1, wherein at least sections of said free length of an outer surface of the bristle have a straight cylindrical envelope.

6. The bristle of claim 1, wherein a conicity angle is smaller than 50 or smaller than 10.

7. The bristle of claim 1, wherein at least sections of a bristle jacket have a roughness or a roughness in a micro range.

8. The bristle of claim 1, wherein a geometrical cross-sectional shape of the bristle changes in said tip region.

9. The bristle of claim 1, wherein transitions between profilings and/or between said profiling and said depression-free jacket are smooth and continuous.

10. The bristle of claim 1, wherein a section with a depression-free jacket is disposed between two axially separated profilings.

11. The bristle of claim 1, wherein several grooves are disposed one on top of an other.

12. The bristle of claim 1, wherein a sharp edge is formed between neighboring grooves.

13. The bristle of claim 1, wherein the bristle has a crossed or star-shaped cross-section in a region of said profiling with several ribs extending in a longitudinal direction of the bristle which are distributed about a bristle periphery.

14. The bristle of claim 1, wherein the bristle has one of a polygonal, a triangular, and a four-sided cross-section in a region of said profiling.

15. The bristle of claim 1, further comprising regions in which two different profilings overlap one another.

16. The bristle of claim 1, wherein said tip section is formed by axially extending fingers.

17. The bristle of claim 1, wherein said the bristle comprises axially sequential parts of different materials.

18. The bristle of claim 17, wherein at least one of said parts is colored.

19. The bristle of claim 17, wherein at least one of said parts is designed as a wear indicator.

20. The bristle of claim 1, wherein the bristle has an inner hollow axial channel, starting from said root region.

21. The bristle of claim 20, wherein said hollow channel extends through an entire bristle to just below said free end.

22. The bristle of claim 20, wherein said hollow channel extends through an entire bristle and opens into said tip section.

23. The bristle of claim 1, wherein said profiling has at least one axial profiled element, which forms said tip section.

24. The bristle of claim 1, wherein a transition between said profiling and an unprofiled jacket is in a plane, which extends substantially perpendicular to a longitudinal axis of the bristle.

25. The bristle of claim 1, wherein a transition between said profiling and an unprofiled jacket is in a plane, which extends at an angle with respect to a longitudinal axis of the bristle.

26. The bristle of claim 1, wherein an entire bristle 15 provided with a cover.

27. The bristle of claim 1, wherein said shaft base section has an axial length of ≦10 mm or ≦1 mm.

28. The bristle of claim 1, wherein said bristle has structural properties defined by casting or injection molding of the bristle.

29. The bristle of claim 1, wherein said shaft region comprises 35% to 65% of said free length of the bristle.

30. A bristle for mounting in or to a bristle support, in particular for a cleaning brush, a toothbrush, or an application brush, the bristle comprising:
   a lower root region, said root region for mounting in or to the bristle a support or for forming a part of the bristle support;
   a lower shaft base section bordering said root region;
   a shaft section disposed adjacent to and above said lower shaft base section, said lower shaft base section and said shaft section forming a shaft region;
   a lower active flexing section bordering above said shaft region;
   a tip section disposed above and adjacent to said lower active flexing section and defining a free end of the bristle,
   said lower active flexing section and said tip section constituting a flexing region, said flexing region and said shaft region constituting a free length of the bristle lying outside of the bristle support and being disposed above said root region,
   wherein the bristle has a continuous, depression free jacket in said shaft base section and in said shaft section, and
   at least portions of a jacket in said flexing region have a profiling defining elevations and/or depressions disposed within a peripheral surface of the bristle;
   wherein said profiling comprise at least one groove which extends about the bristle, and
   wherein said shaft region comprises 15% to 85% of said free length of the bristle; and wherein said profiling has several longitudinal grooves disposed next to each other about a circumferential direction of the bristle.

31. A bristle for mounting in or to a bristle support, in particular for a cleaning brush, a toothbrush, or an application brush, the bristle comprising:
- a lower root region, said root region for mounting in or to the bristle support or for forming a part of the bristle support;
- a lower shaft base section bordering said root region;
- a shaft section disposed adjacent to and above said lower shaft base section, said lower shaft base section and said shaft section forming a shaft region;
- a lower active flexing section bordering above said shaft region;
- a tip section disposed above and adjacent to said lower active flexing section and defining a free end of the bristle,
- said lower active flexing section and said tip section constituting a flexing region, said flexing region and said shaft region constituting a free length of the bristle lying outside of the bristle support and being disposed above said root region,
- wherein the bristle has a continuous, depression free jacket in said shaft base section and in said shaft section, and
- at least portions of a jacket in said flexing region have a profiling defining elevations and/or depressions disposed within a peripheral surface of the bristle;
- wherein said profiling comprises at least one groove which extends about the bristle, and
- wherein said shaft region comprises 15% to 85% of said free length of the bristle; and
- wherein at least portions of the bristle are provided with a coating.

32. The bristle of claim 31, wherein at least portions of said profiling are provided with said coating.

33. The bristle of claim 31, wherein said coating is designed to indicate wear.

34. A bristle for mounting in or to a bristle support, in particular for a cleaning brush, a toothbrush, or an application brush, the bristle comprising:
- a lower root region, said root region for mounting in or to the bristle support or for forming a part of the bristle support;
- a lower shaft base section bordering said root region;
- a shaft section disposed adjacent to and above said lower shaft base section, said lower shaft base section and said shaft section forming a shaft region;
- a lower active flexing section bordering above said shaft region;
- a tip section disposed above and adjacent to said lower active flexing section and defining a free end of the bristle,
- said lower active flexing section and said tip section constituting a flexing region, said flexing region and said shaft region constituting a free length of the bristle lying outside of the bristle support and being disposed above said root region,
- wherein the bristle has a continuous, depression free jacket in said shaft base section and in said shaft section, and
- at least portions of a jacket in said flexing region have a profiling defining elevations and/or depressions disposed within a peripheral surface of the bristle;
- wherein said profiling comprises at least one groove which extends about the bristle, and
- wherein said shaft region comprises 15% to 85% of said free length of the bristle; and
- wherein said root region and said shaft base section are provided with a cover.

35. The bristle of claim 34, wherein said cover is part of the bristle support.

* * * * *